US011860088B2

(12) United States Patent
Youssef et al.

(10) Patent No.: US 11,860,088 B2
(45) Date of Patent: Jan. 2, 2024

(54) APPARATUS AND METHOD FOR DYNAMIC CHARACTERIZATION OF MATERIALS

(71) Applicant: San Diego State University (SDSU) Foundation, San Diego, CA (US)

(72) Inventors: George Youssef, Solana Beach, CA (US); Nha Uyen Huynh, La Jolla, CA (US)

(73) Assignee: SAN DIEGO STATE UNIVERSITY (SDSU) FOUNDATION, San Diego, CA (US)

( * ) Notice: Subject to any disclaimer, the term of this patent is extended or adjusted under 35 U.S.C. 154(b) by 0 days.

(21) Appl. No.: 17/770,277

(22) PCT Filed: Oct. 30, 2020

(86) PCT No.: PCT/US2020/058391
§ 371 (c)(1),
(2) Date: Apr. 19, 2022

(87) PCT Pub. No.: WO2021/087383
PCT Pub. Date: May 6, 2021

(65) Prior Publication Data
US 2022/0373458 A1 Nov. 24, 2022

Related U.S. Application Data

(60) Provisional application No. 62/929,586, filed on Nov. 1, 2019.

(51) Int. Cl.
*G01N 21/3586* (2014.01)
*G01N 21/41* (2006.01)

(52) U.S. Cl.
CPC ......... *G01N 21/3586* (2013.01); *G01N 21/41* (2013.01)

(58) Field of Classification Search
CPC .......................... G01N 21/3586; G01N 21/41
See application file for complete search history.

(56) References Cited

U.S. PATENT DOCUMENTS

2005/0182478 A1    8/2005   Holman et al.
2008/0149818 A1    6/2008   Wolleschensky et al.
(Continued)

OTHER PUBLICATIONS

Veysset et al., "Interferometric analysis of laser-driven cylindrically focusing shock waves in a thin liquid layer" Scientific Reports, v 6, n 24, p. 1-7.
(Continued)

*Primary Examiner* — David P Porta
*Assistant Examiner* — Fani Polyzos Boosalis
(74) *Attorney, Agent, or Firm* — Greer, Burns & Crain, Ltd

(57) ABSTRACT

A testing apparatus for dynamic characterization of a sample of a material under test. A terahertz (THz) time-domain spectroscopy system is configured and arranged to generate and detect terahertz waves to interrogate the sample. A shock wave loading system is configured and arranged to produce a shock wave in the sample concurrently with said THz spectroscopy device interrogating the sample. The sample undergoes changes in an index of refraction in response to the produced ultrafast shock wave in the sample that are detected by the terahertz spectroscopy system.

20 Claims, 22 Drawing Sheets

(56) References Cited

U.S. PATENT DOCUMENTS

| | | | |
|---|---|---|---|
| 2008/0149819 A1* | 6/2008 | Zhdaneev | G01N 21/3581 |
| | | | 250/336.1 |
| 2009/0206263 A1 | 8/2009 | Rahman | |
| 2012/0049070 A1 | 3/2012 | Mousavi et al. | |
| 2012/0152198 A1 | 6/2012 | Kim et al. | |
| 2014/0321772 A1 | 10/2014 | Piche et al. | |
| 2015/0205090 A1 | 7/2015 | Jalali et al. | |

OTHER PUBLICATIONS

International Preliminary Report on Patentability for PCT/US2020/058391, dated May 12, 2022.

* cited by examiner

APPARATUS AND METHOD FOR DYNAMIC CHARACTERIZATION OF MATERIALS

CROSS-REFERENCE TO RELATED APPLICATIONS

This national phase application claims benefit of priority under 35 U.S.C. § 371 to Patent Convention Treaty (PCT) International Application PCT/US2020/042309, filed Jul. 16, 2020, which claims the benefit of priority to U.S. Provisional Application Ser. No. 62/929,586, filed Nov. 1, 2019, now expired. The aforementioned applications are expressly incorporated herein by reference in their entirety and for all purposes.

GOVERNMENT LICENSE RIGHTS

This invention was made with government support under Grant/Contract Nos. W911NF1810477 awarded by the U.S. Department of Defense, and Award No. 1925539 awarded by the National Science Foundation. The government has certain rights in the invention.

FIELD

The present disclosure to generally to the field of material testing. Particular embodiments of the invention relate more specifically to apparatuses, systems, and methods for in-situ, dynamic characterization of materials under load.

BACKGROUND

It is advantageous in many applications to characterize properties of materials such as polymers, metals, or ceramics under load. For instance, it is known to submit samples of such materials to a push/pull load, and measure the resulting behavior such as strain, generally looking at an average.

As one example, polymers are an important class of materials for a plethora of load and non-load bearing applications, where polymers constitute a large portion of raw materials used in engineered products such as cellular phones, automobiles, and household goods, to name a few examples. Polymers, including but not limited to plastics, are common in everyday applications from walking shoes to protective gears and bulletproof structures. The diversity of the sub-classification of polymers mirrors the variety of applications they are used in, including thermosets, thermoplastic, elastomers, biodegradable, and biopolymers, which eludes to the differences in the underlying molecular structure.

Specific to this class of materials is the high dependence of mechanical performance (i.e., the functionality of the deployed product) on the loading scenario as well as the environmental conditions and the chemical structure, which gives rise to molecular rearrangements that may be reversible or irreversible based on a balance between the strain energy imparted on the sample during loading and the activation energy required for irreversibility.

Collectively, these parameters impose practical challenges on understanding (hence predicting) the behavior of polymers during deployment. While in silico experiments using Molecular Dynamics (or the like) approaches have proven to be essential tools polymer science and engineering, continuum modeling remains essential not only to bridge the scale gap but also for practical applications.

Such behavior of polymeric materials under load may be affected, for instance, by conditions such as temperature. As one nonlimiting example application, polymers used in impact mitigating armors are hypothesized to undergo a shift in the glass transition temperature and a change in the free volume during ultrahigh strain mechanical loading.

However, due to unavailability of experimental mechanics setups capable of dynamically loading polymer materials while simultaneously characterizing the molecular conformational changes in the polymer structure, a gap in the understanding of the primary impact mitigation mechanisms persists. This hinders the optimization of the effectiveness of designs for various polymer-based products such as but not limited to armors.

SUMMARY

According to one aspect of the disclosed embodiments, an apparatus is provided for dynamic characterization of a sample of a material under test. A terahertz (THz) time-domain spectroscopy system is configured and arranged to generate and detect terahertz waves to interrogate the sample. A shock wave loading system is configured and arranged to produce a shock wave in the sample concurrently with said THz spectroscopy device interrogating the sample. The sample undergoes changes in an index of refraction in response to the produced ultrafast shock wave in the sample that are detected by the terahertz spectroscopy system.

In some embodiments, the THz time-domain spectroscopy system is configured to interrogate the sample concurrently with the producing of the shock wave, while in other embodiments, the THz time-domain spectroscopy system is configured to interrogate the sample at least partially subsequently to the producing of the shock wave. In some, but not all, embodiments, the shock wave loading system is configured to produce ultrafast shock waves in the sample.

According to another aspect of the disclosed embodiments, a method is provided for testing a sample of a material under test. A shock wave is produced in the sample. Terahertz waves are generated and detected to interrogate the sample, wherein the sample undergoes changes in an index of refraction in response to the produced shock waves in the sample. Electrical signals in response to the detected terahertz waves. The generated electrical signals are analyzed in the time domain to determine one or more mechanical properties of the sample.

In some embodiments, generating and detecting terahertz waves is concurrent with said producing a shock wave in the sample, while in other embodiments generating and detecting terahertz waves is at least partially subsequent to said producing a shock wave in the sample. In some, but not all, embodiments, the produced shock waves are ultrafast shock waves.

Other features and advantages of the invention will be apparent from the following specification taken in conjunction with the following drawings.

DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Introduction

Figure 1:
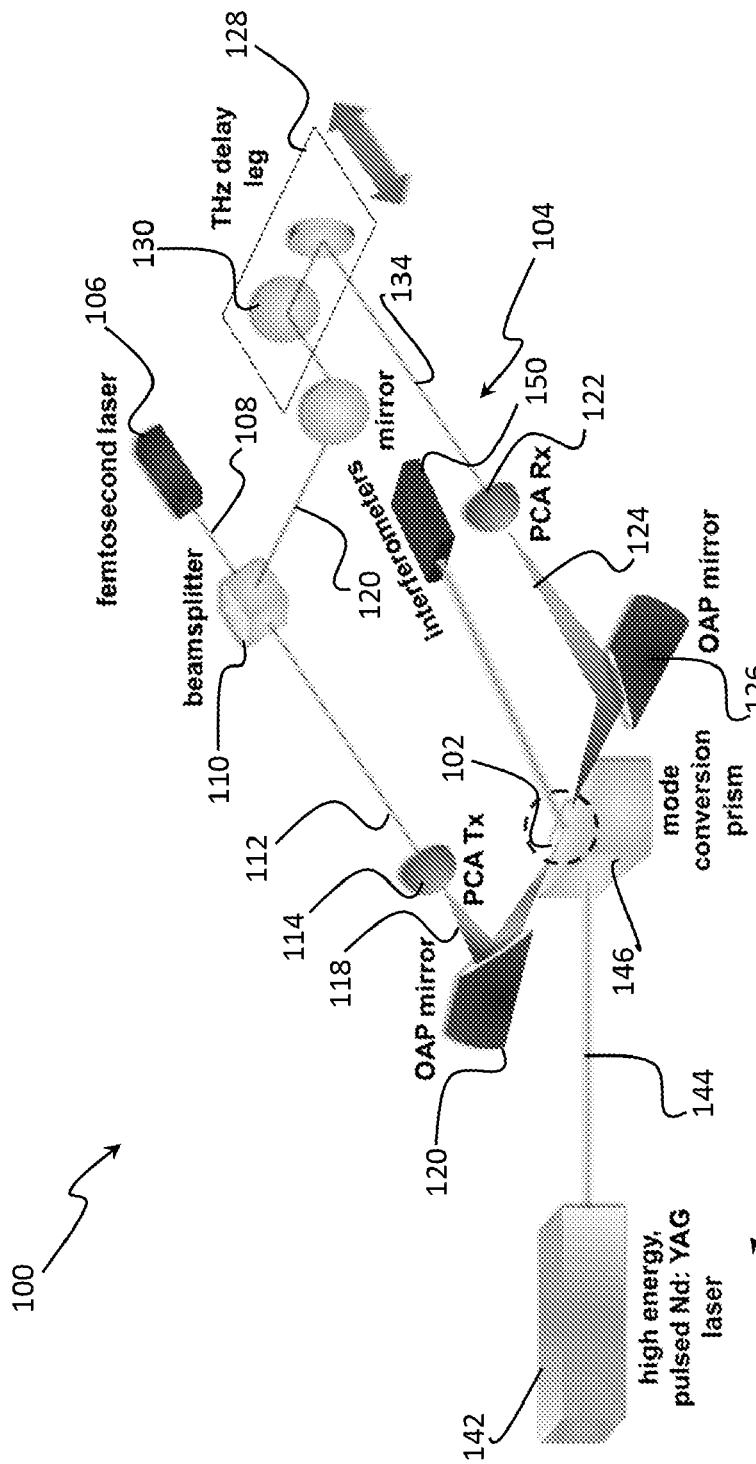
FIG. 1 shows an example testing apparatus embodied in a system for testing a sample of a material under test.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

Example embodiments of the invention provide, among other things, a method and apparatus for testing a sample of a material under test. An example method includes loading and localizing change in stress/strain in the sample to understand change of the material under test on a microstructural, e.g., molecular, level. This can help one understand how molecules of the material reconfigure themselves in response to loading. Environmental conditions can optionally be configured or adjusted as well to further determine a change in response to loading and to such environmental conditions and/or to improve testing conditions. For instance, some example apparatuses can also be used to study the reaction of the materials to loading under electrical, thermal, and/or magnetic fields in a controlled environment. Example materials that can be tested include, but are not limited to, polymers, metals, ceramics, composite materials, glasses, etc.

For instance, it is known that the mechanical response of polymers exhibits a strong dependence on the molecular structure, the loading rate, and temperature such that thermosets, thermoplastics, and elastomers have unique stress-strain behavior that may span over a few hundred percentages of strains. Elastomeric materials have a mechanical response with large stretch ratios, indicating a corresponding increase in the mechanical work done on the material. The mechanical work is captured by the strain energy calculated by taking the area under the stress-strain curve.

There exist numerous ways of measuring strain where the selection of the method depends on (1) the strain percentage, e.g., large strain extensometer, (2) the scale with which optical methods are suitable for microscale measurements, and mechanical methods are feasible for meso and macro scale, and (3) the strain rate where the sampling rate is the deciding factor. However, load application overwhelmingly relies on screw-driven or servo-hydraulic mechanisms in a load-frame type structure, but other experimental setups exist to investigate the mechanical response of materials under different strain rates. Nonetheless, much of the strain and stress measurement/application methods are not conducive for integration in analytical chemistry instrumentation to elucidate the interrelationship between conformational changes and mechanical loading. Therefore, there is a need to develop a mechanism allowing the remote control of the state of stress without obscuring the observation site.

The strain energy density is the result of the applied load and the deformed geometry, while the activation energy is an intrinsic property of the macromolecule that is fundamentally connected to the bonds linking the backbone as well as the final arrangements of molecules after polymerization. These quantities should be investigated simultaneously, given the relaxation behavior of polymers that negates the reversible contributions during the load history to reconcile the balance between strain and activation energies. Thus, the mechanical loading scenario and characterization methodology should be concurrently performed to capture the stress-induced macromolecule conformational arrangements.

Some example apparatuses (testing apparatuses) and methods for testing a sample of a polymer material disclosed herein integrate mechanical ultrahigh strain loading and spectroscopy methods for concurrent and in situ characterization of polymer materials undergoing mechanical deformation in response to the ultrahigh strain loading, optionally at different temperatures, simulating the impact from hypervelocity projectiles. Some illustrative examples described herein will be discussed with reference to testing polymer materials. However, it will be appreciated that other classes of materials and/or other environmental conditions may be tested.

Example apparatuses and methods integrate ultrahigh strain rate loading and spectroscopy, and, optionally one or more environmental controls. Environmental controls include, but are not limited to, temperature control, electrical field control, magnetic field control, light control, atmospheric control (e.g., controlling ambient gases by purging or introducing one or more gases), etc. for dynamic characterization of materials.

In an example operation, selected THz spectroscopy, that is, spectroscopy performed in the terahertz (THz) regime, as a nonlimiting example, at frequencies from 0.1 THz-5.0 THz (depending on, for instance, the THz wave source), is employed to interrogate the material under test. For instance, a terahertz (THz) spectroscopy device can be configured and arranged to generate and detect terahertz waves to interrogate the sample.

An ultrafast shock wave loading mechanism is configured and arranged to produce an ultrafast shock wave in the sample concurrently with the THz spectroscopy device interrogating the sample. To provide ultrahigh strain rate loading, for instance, a laser-induced shock wave can be generated by a high energy laser, e.g., a laser capable of generating a nanosecond duration pulse, with 0.1-6.0 Joule of energy, that interacts with the material under test. THz spectroscopy can be performed in situ, e.g., such that the spectroscopy is interrogating the sample at the same time the high-energy laser is imparting the shock wave on the sample, or ex situ (where the spectroscopy is performed independently, e.g., sequentially, overlapping, etc. with the imparting of the shock wave), and dynamically (e.g., time-dependent loading and characterization). During such an example operation, molecules of the material under test try to align, which alignment on a microstructural level can be assessed using example spectroscopy methods.

While certain spectroscopy techniques have been disclosed for testing materials, such techniques have been limited to a very thin layer of surface. By contrast, example systems and method can assess, for instance, a microstructure of the material to be tested.

Further, some conventional material testing methods use a significantly greater amount of stress and strain during load testing, one particular example being the use of ballistics. However, such larger stress and strain can result in sudden failure and even destruction of the material under test.

A laser-induced shock wave according to example embodiments can provide high stress and low strain, and little or no chance for annealing (that is, no time to go through creep or fatigue). This can produce a more intrinsic response of the material, which allows one to find more fundamentally how materials fail, and thus allows designs using the tested materials on a higher level.

A chamber or other container may be provided for containing or housing the sample in example embodiments, though in other embodiments the sample may be tested without being housed in a chamber, such as in an open environment, or partially housed. An environmental control apparatus may also be provided for inducing an environmental change, either before or concurrently with (e.g., during) the interrogating the sample and the producing of ultrafast shock waves. Further example embodiments of such apparatuses are disclosed herein.

In some example embodiments including one or more environmental controls, a temperature of the sample and/or of the environment in which the sample is being tested is controlled in situ to assess the effect of temperature on the material's behavior. A temperature control device may be provided for inducing a temperature change in the sample, either before or concurrently with (e.g., during) the interrogating the sample and producing ultrafast shock waves. Further example embodiments of such apparatuses are disclosed herein.

As a nonlimiting example, the material may be disposed within an environmentally controllable chamber for housing the sample, and temperature-altering materials such as but not limited to liquid nitrogen and/or supercooled materials can be used for cooling an interior of the chamber. This is useful, for instance, for testing polymer materials, though it is not limited to such materials. Environmental controls may also be useful in some embodiments to enhance results from testing or to protect a material under test. Other devices and methods for environmental controls are disclosed herein.

Other example embodiments of the invention provide a method for testing a sample using a testing apparatus according to any of the embodiments disclosed herein.

Example Embodiments

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

FIG. 1 shows an example testing apparatus embodied in a system 100 for testing a sample 102 of a material under test, providing terahertz spectroscopy and a laser-induced shock wave non-contact loading mechanism. For instance, the sample 102 may be a sample of polymeric material. The example system 100 generally includes an interrogation subsystem embodied in a Terahertz Time-Domain Spectroscopy (THz-TDS) subsystem 104. By "time-domain spectroscopy" it is intended that the spectroscopy data is collected in the time domain, and material properties of the sample can be extracted directly from such time-domain data, that is, without first converting the data to the frequency domain. The THz-TDS subsystem 104 is configured and arranged with respect to the sample 102 to generate for and detect terahertz waves from the sample. Example THz-TDS subsystems can generate and/or detect terahertz waves using one or more laser pumps, photoconductive antennas, nonlinear optics (e.g., optical ZnTe crystals), Schottky diode, quantum cascade laser, and/or by any other available method or combination of methods without affecting the general concept of operation.

The example THz-TDS subsystem 104 includes one or more optical and terahertz components arranged with respect to the sample 102 that are excited by a femtosecond laser pump 106 in particular configurations to provide proper timing of both the optical laser beam 108 (used in generation and detection of THz waves) and THz waves used in the spectroscopic characterization of the sample. In FIG. 1, the example THz-TDS subsystem 104 includes a beam splitter 110 disposed in a path of the laser pump 106 to receive the generated optical laser beam 108 and emit a first beam 112 along a first path to an active area of a photoconductive antenna (PCA) transmitter (PCA Tx) device 114. The PCA Tx device 114 receives the first beam 112 and generates terahertz waves 118. An off-axis parabolic (OAP) mirror 120 receives the generated terahertz wave 118 from the PCA Tx device 114 and emits the terahertz waves to the sample 102 to propagate through the sample. A photoconductive receiver antenna (PCA Rx) device 122 measures the signal provided by a THz wave 124 after propagating through the sample 102 and another OAP mirror 126.

Concurrently, along a second path, a second beam 120 from the beam splitter 110 is emitted to an optical delay leg 128, including one or more optical mirrors 130. The delay leg 128 is used to ensure that the optical path and the terahertz path meet at exactly (e.g., within picoseconds of) the same time at the receiver antenna of the PCA Rx device 122. The optical delay leg 128 can be adjustable, e.g., using a one-dimensional (e.g., linear) motorized stage powered by a motor (e.g., a DC motor) to selectively adjust the distance (e.g., up to 25 mm) and speed (e.g., between 0.02 mm/s to 1000 mm/s) of the optical path travel. A delayed beam 134 from the delay leg 128 (optically) activates the PCA Rx device 122 converting the (electromagnetic) THz waves after propagating through the sample 102 into a measurable electrical signal, which can be recorded, such as by a lock-in amplifier (not shown) and data acquisition system (not shown).

It will be appreciated that additional intermediate components, such as but not limited to additional beam splitters, optical mirrors, OAP mirrors, etc., may be provided in the THz-TDS subsystem 104 in various configurations, nonlimiting examples of which are provided herein for illustration. Thus, it is to be understood that reference herein to "emitting to" or "receiving from" various components in the THz-TDS subsystem 104 may refer to direct or indirect receiving or emitting depending on the presence or absence of additional intermediate components.

To provide ultrafast loading, e.g., a strain rate between $10^6$ s$^{-1}$-$10^8$ s$^{-1}$, the system 100 further includes a ultrafast loading subsystem, which can be provided by a laser-induced shock waves (LSW) loading mechanism 140. The LSW loading mechanism 140 includes a high energy pulse laser 142, such as a high energy, pulsed Nd:YAG laser. A high energy pulsed laser beam 144 generated by the high energy pulse laser 142 is fed to a mode conversion prism 146, which is positioned with respect to the sample 102, e.g., in direct contact, e.g., adhered, to the prism, converting to pressure and shear stress waves. The optical beam of high energy pulsed laser 142 is converted to a stress (pressure) wave at the surface of mode conversion prism 146 that propagates through the prism, and then transfers to the sample.

In an example testing operation, the high energy pulsed laser 142 generated by the ultrafast loading subsystem, e.g., the LSW loading mechanism 140, is used to exfoliate a sacrificial energy absorbing layer (not shown) disposed on the prism to launch an ultrafast pressure shock wave into the sample due to rapid thermal expansion. A nonlimiting example sacrificial layer is made from a thin layer of aluminum that is sputtered on the surface of the prism facing the laser. The pressure shock wave then propagates throughout the sample 102, causing compaction of the macromolecules in the sample, changing the sample's free volume, and resulting in the evolution of the configurational entropy in the sample material. Concurrent to the ultrafast pressure shock wave, the sample 102 is interrogated by the terahertz spectroscopy subsystem, e.g., by the THz-TDS 104, which is used to measure the change in free volume by monitoring the changes in the index of refraction.

Concurrently, e.g., synchronically, with the operation of the ultrafast loading subsystem 140 and the terahertz spectroscopy subsystem 104, the free-surface displacement of the reverberating sample 102 due to the propagating shock wave may be measured using a non-contact interferometric method, such as by using a non-contact interferometer 150 suitably arranged in the system 100 with respect to the sample 102. The free-surface displacement can be used to elucidate the state of stress throughout the continuum of the sample 102 using elastodynamic calculations.

Figure 2:
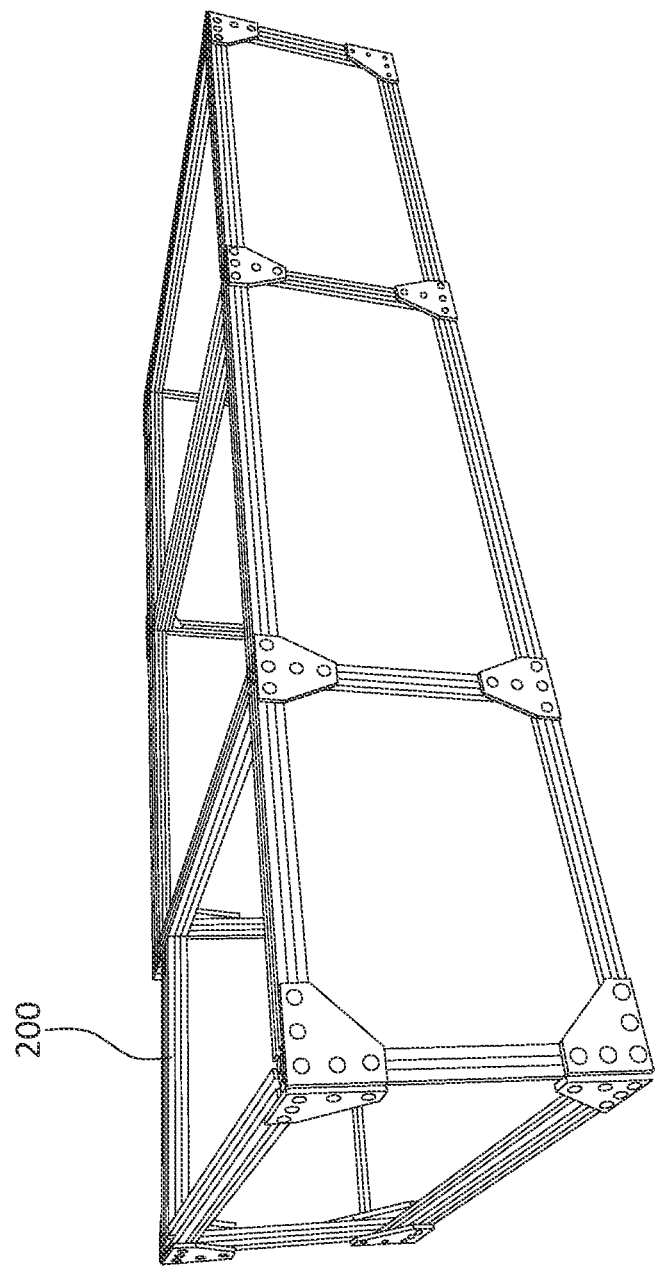
FIG. 2 shows an example characterization chamber for testing, in a closed position.
Figure 3:
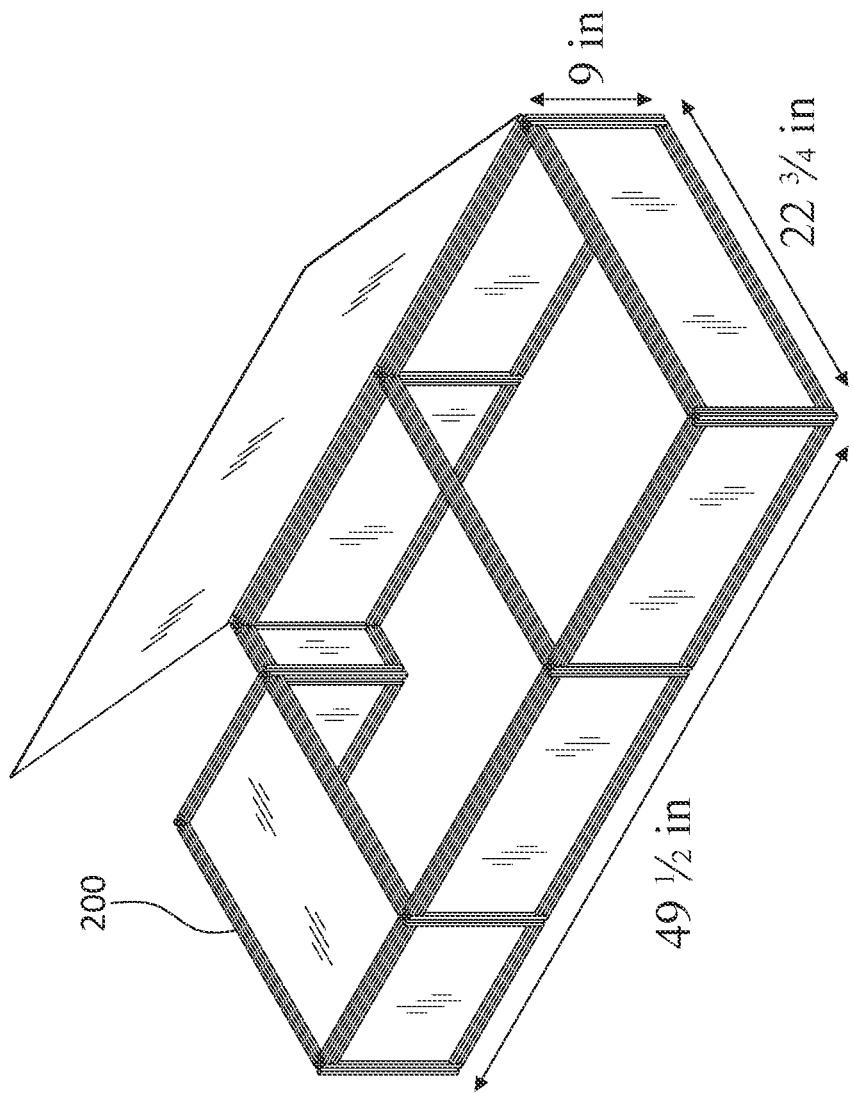
FIG. 3 shows an example characterization chamber for testing, in a partially open position.

Additional subsystems of the testing system 100 can optionally provide an environmental control subsystem that includes one or more sources of environmental controls, such as applied electrical, thermal, magnetic, or light fields, and/or ambient gases (purged or introduced). The testing system 100, or one or more components or subsystems thereof, may be disposed partially or entirely within a chamber 200, e.g., a characterization chamber as shown by example in FIGS. 2 (shown closed) and 3 (shown partially open). The chamber 200 may be of any suitable configuration and constructed of any suitable material to provide desired environmental controls (including, optionally, no environmental controls) therein. Components for an example system 100, including the femtosecond laser, laser optics, THz optics, and chamber can be assembled into the subsystem. One or more environmental control systems may be incorporated into the testing system 100, e.g., added as attachments to the chamber 200.

For instance, the propagation of THz waves can be sensitive to water molecules, and accordingly an inert gas such as nitrogen can be introduced to displace water and oxygen in the environment. Thus, in the testing system 100, the sample 102, the terahertz spectroscopy subsystem 104, the ultrafast loading subsystem 140, and/or the non-contact interferometer 150) can be enclosed in the chamber 200 providing a nitrogen (or any other inert gas) purged box. The chamber 200 can additionally or alternatively be configured to house light-sensitive as well as photo-luminance test samples. Example chambers 200 can be configured for ease of fabrication and assembly, providing protection of optical components, and flexibility in reconfiguration to integrate one or more additional subsystems.

Other example environmental controls can provide a temperature controlled testing environment. As one example, the sample 102 may be mounted in a cryogenic stability chamber (cryostat), provided by the chamber 200 or a different chamber. Sample heating can be doing through convection heating, induction coils, etc. Similarly, sample cooling can be done using Peltier elements, forced convection using supercooled gases (LH or $LN_2$), etc. Temperature control can also be accomplished by other temperature control devices, systems, or methods under principles of example systems and methods herein. Other components of an example temperature control subsystem, such as a storage dewar, transfer lines, or temperature controller can be assembled according to example configurations. One or more temperature controlling devices or systems can be attached to a chamber, e.g., chamber 200, disposed within the chamber, etc.

Additional environmental control devices or systems that may be provided as attachments include, but are not limited to, high voltage amplifiers and conductive plates to subject the test sample to an electric field; electromagnets and power supplies to subject the samples to a magnetic field; and others. Any suitable combination of environmental controls can be used, and such controls can be arranged in the testing system 100 in various ways, as will be appreciated by an artisan.

Example Testing Method

Illustrative principles of example testing methods using terahertz spectroscopy and ultrafast loading will now be described. Though polymers are used as an example class of material to be tested, it will be appreciated that example methods may be similarly used to test other materials.

An example laser-induced shock waves technique provided by the high energy pulse laser 142 employs the optical power of a quality-switched (Q-switched) laser with high energy and short pulse duration, hence making it a non-contact loading mechanism. The pressure (P, in GPa) can be related to the laser intensity ($I_{15}$, in $10^{15}$ W/cm$^2$), which is a function of the spot size (A, in cm$^2$) and the laser energy (E, in J), using the Lindl's equation:

$$P = 4000(I_{15}/\lambda)^{2/3} \qquad (1)$$

where, $\lambda$ is the laser wavelength in μm. A particular example high-energy pulse laser 142 is a high-energy pulsed Nd:YAG laser with 0.532 μm wavelength, typical mean rise time (t) of 2-5 ns, and pulse energy of up to 6 J, which is believed to be unprecedented in the area of laser-induced shock waves (LSW). The specific configuration of the laser in the ultrafast loading subsystem 140 can vary as far as the laser is capable of generating short duration, high energy pulses.

Figure 4:
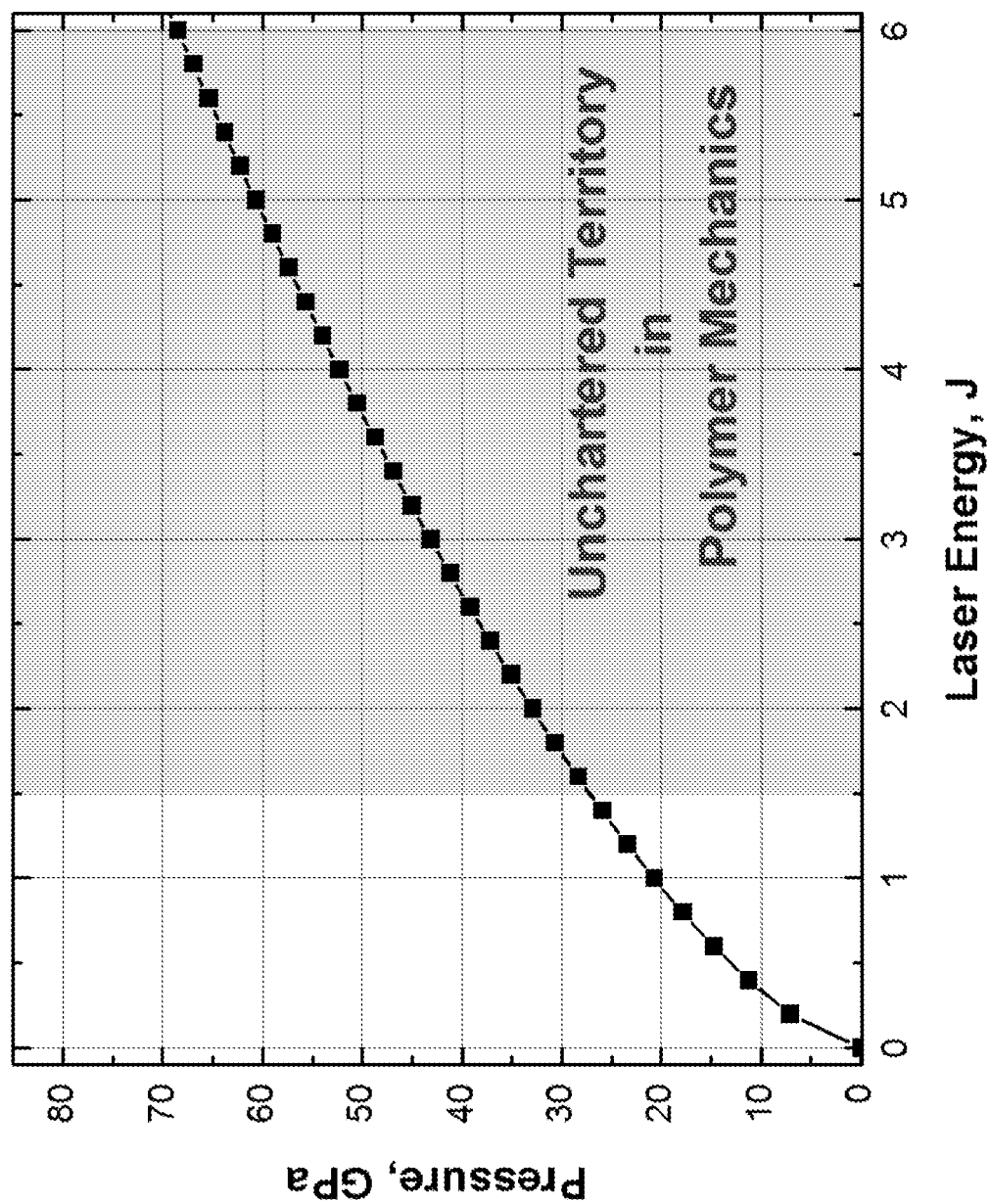
FIG. 4 shows an estimation of pressure amplitude based on laser energy using Lindl's equation, showing the ability of LSW to generate high-amplitude pressures

In prior use of LSW, a spot diameter has been varied between below a millimeter to a few millimeters depending on the class of the tested material (e.g., polymers, composites, metals, etc.). Therefore, the laser intensity, $I_{15}=E/A \cdot t$, can be calculated as the ratio between the laser energy and product of rise time (2 ns) and spot size (0.005 cm$^2$). The interrelation between the generated pressure and laser energy is shown in FIG. 4, which demonstrates the basis of the non-obvious physical phenomena leveraged in example methods to generate colossal pressure waves without any contact with the test samples.

Most polymers, as a nonlimiting example, are transparent to THz waves, thus example THz-TDS spectroscopy methods can be particularly suitable for in-situ characterization, since the propagating wave intimately interacts with the macromolecule hence inheriting changes to the conformational orientation. The conformation of polymer chains in response to loading conditions plays a vital role in the performance of the polymers to effectively endure the effect of the incoming loading. The conformation is an interplay between the configuration of the polymer and the associated molecular motion, where the molecular motion is highly dependent on the operating temperature, specifically where it lays with respect to the glass transition temperature ($T_g$), which is a fundamental material parameter signifying the transition between the glassy and the rubbery states of the polymeric materials. In turn, the physical and mechanical properties of polymers, e.g., stiffness and strength, significantly change above and below $T_g$.

Despite its importance, the microscopic interpretation of the glass transition is somewhat ambiguous since $T_g$ is not a sharp transition, but rather spreads over a certain temperature range. This hinders a clear physical, exact definition of $T_g$ as a discrete value, which cannot be satisfactorily explained by equilibrium thermodynamics. Additionally, the theoretical considerations of kinetics fail to reproduce the experimental values when approaching the glass transition, especially in the case of semi-crystalline polymers. Alternatively, the glass transition is rather dominated by relaxation processes that can be elucidated with the concept of free volume.

Figure 5:
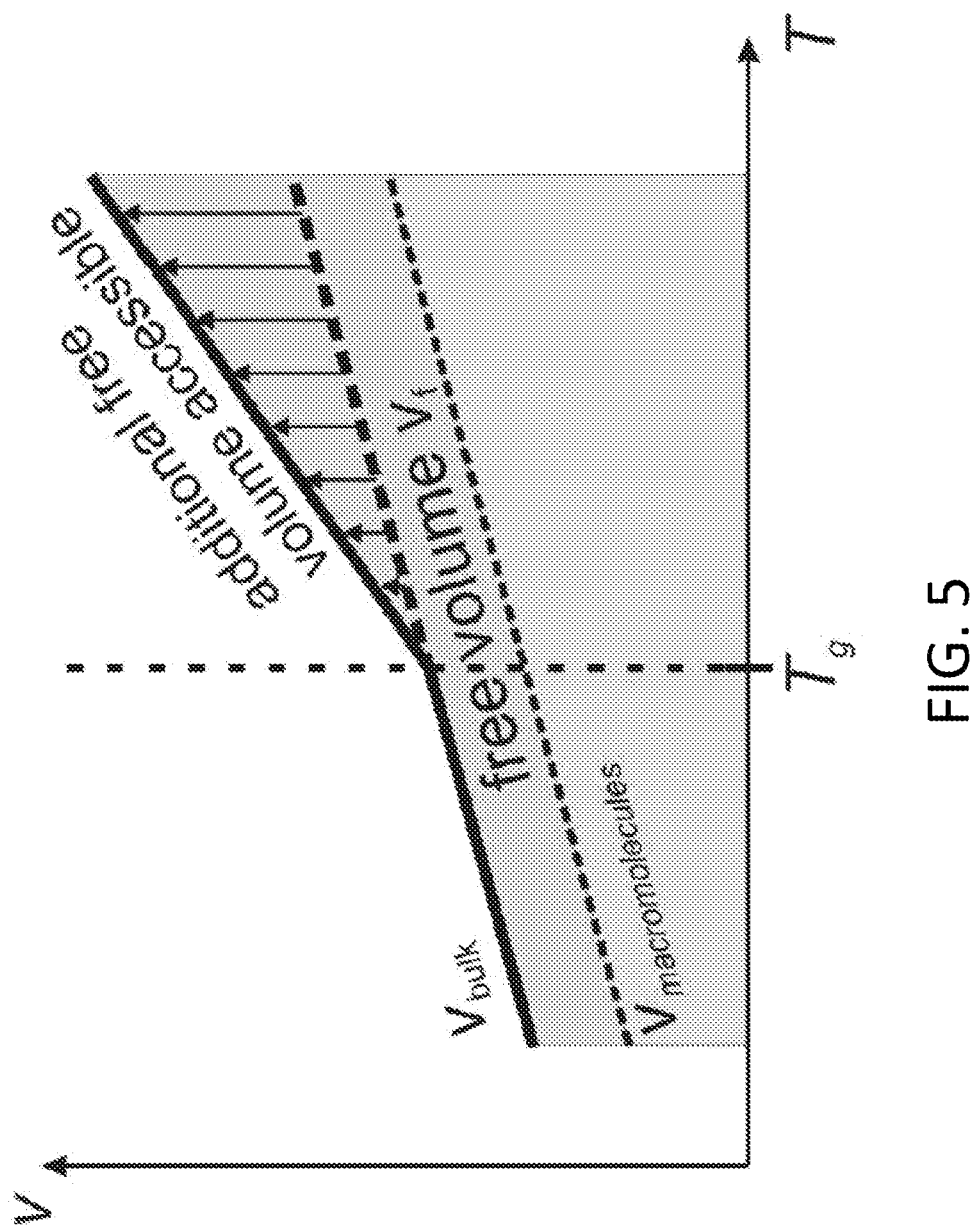
FIG. 5 shows a relation between intermolecular free volume and temperature.

FIG. 5 illustrates a consideration of $T_g$ as the onset of backbone chain segment motion inside the amorphous domains within the molecular structure of the polymer. The unoccupied space between the macromolecules is the free volume ($V_f$). When the temperature is below $T_g$, the free volume does not change with the temperature since the chains are frozen in place. However, above $T_g$, a linear increase of $V_f$ is observed and attributed to the movement of the macromolecule due to the significant increase in the thermal energy. This increase in the volume results in a decrease in the density while inducing an additional wave propagation mechanism in the case of high strain impact loading scenarios. Therefore, the fundamental coupling between changes in the index of refraction, free volume (density) and temperature can be explicated using terahertz spectroscopy methods such as provided by THz-TDS while dynamically loading the sample 102 with ultrahigh strain shock waves, such as provided by example embodiments herein.

The interrelation between mechanical loading and spectroscopic changes will now be discussed. When laser-induced shock waves are used to mechanically load a test sample made of shock-tolerant polymer, for instance, this results in a free-surface displacement, which can be measured interferometrically, and intermolecular motions that can be explicated spectroscopically using Terahertz time-domain spectroscopy (THz-TDS).

Figure 6:
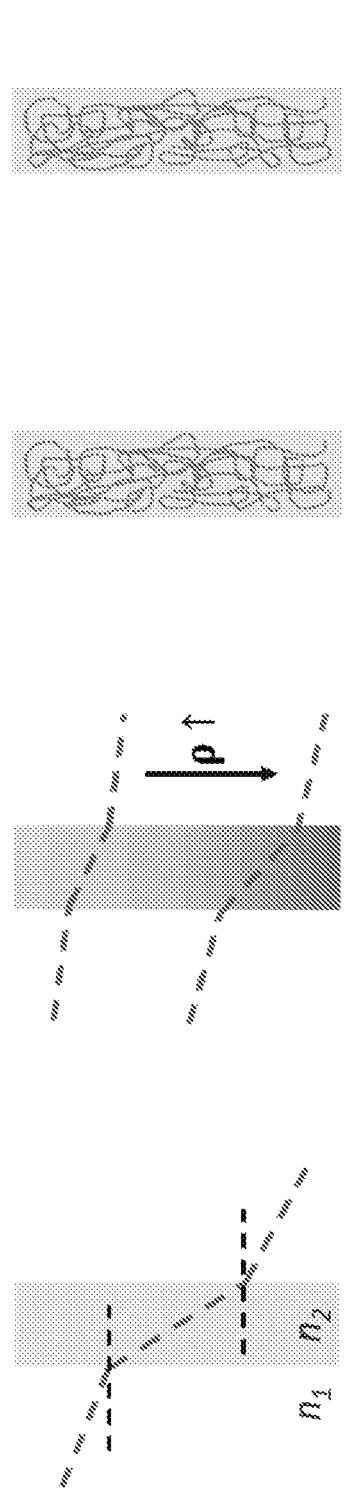
FIG. 6 shows an interrelation between changes in index of refraction and configurational entropy.

The mechanics/spectroscopy interrelationship is shown schematically in FIG. 6. In essence, there are at least two parameters that can be quantified resulting from the ultrahigh strain rate loading applied by the laser-induced shock waves, which are the input mechanical energy (calculated based on the stress wave amplitude and measured free surface displacement) and the change in the index of refraction. The entropy (defined by the second term in Equation 2 below) is related to the change in the index of refraction, which is attributed to the input mechanical energy. On the one hand, the Helmholtz Free Energy ($\psi$) for N number of chain per unit reference volume is written such as:

$$\Psi = e_o - \theta_o N k_B \ln \frac{1}{2\pi^2 r} \int_0^\infty q \sin(qr) \left[ \frac{\sin q^l}{q^l} \right]^n dq \qquad (2)$$

where, $k_B$ is Boltzmann constant and l end-to-end length of chain. On the other hand, the index of refraction (n) is based on Lorentz-Lorenz law, $$\frac{n^2-1}{n^2+1} = \frac{4\pi}{3}N\alpha,$$

where N is the volume per mole and α is the materials polarizability. The relationship between index of refraction (n) and density (ρ) is described by Gladstone-Dale law, $$\frac{n-1}{\rho} = \kappa,$$

where, the constant (κ) is dependent on atomic and molecular structure of unit volume in the materials under investigation.

Once the change in the index of refraction is measured, the change in the free volume (since the mass of the macromolecules remains unchanged) in turn can be reported. It is worth noting that the index of refraction is also dependent on externally applied pressure due to change in the material compaction. Therefore, measuring the index of refraction of the sample as function of propagating stress wave will provide a fundamental measure of the change in the free volume.

Multi-Mode System

Example testing systems 100 according to the above aspects can vary in configuration, arrangement, and/or operation including, but not limited to: (1) example arrangement (location of each component for achieving desired performance), (2) example alignment of optical components (e.g., avoiding points of possible misalignment); and/or (3) example integration of optical systems and components (e.g., components may operate in the nonvisible regime). For instance, components such as lenses, mounts, antennas, etc. can be arranged in a specific configuration not only to generate and receive terahertz waves but to provide an optimal characterization of polymers. Some example systems can allow interfacing with other setups (i.e., cryostat for temperature control and laser shock waves for loading) and/or an in-situ characterization of materials, which is believed to be unique to example setups.

Figure 7:
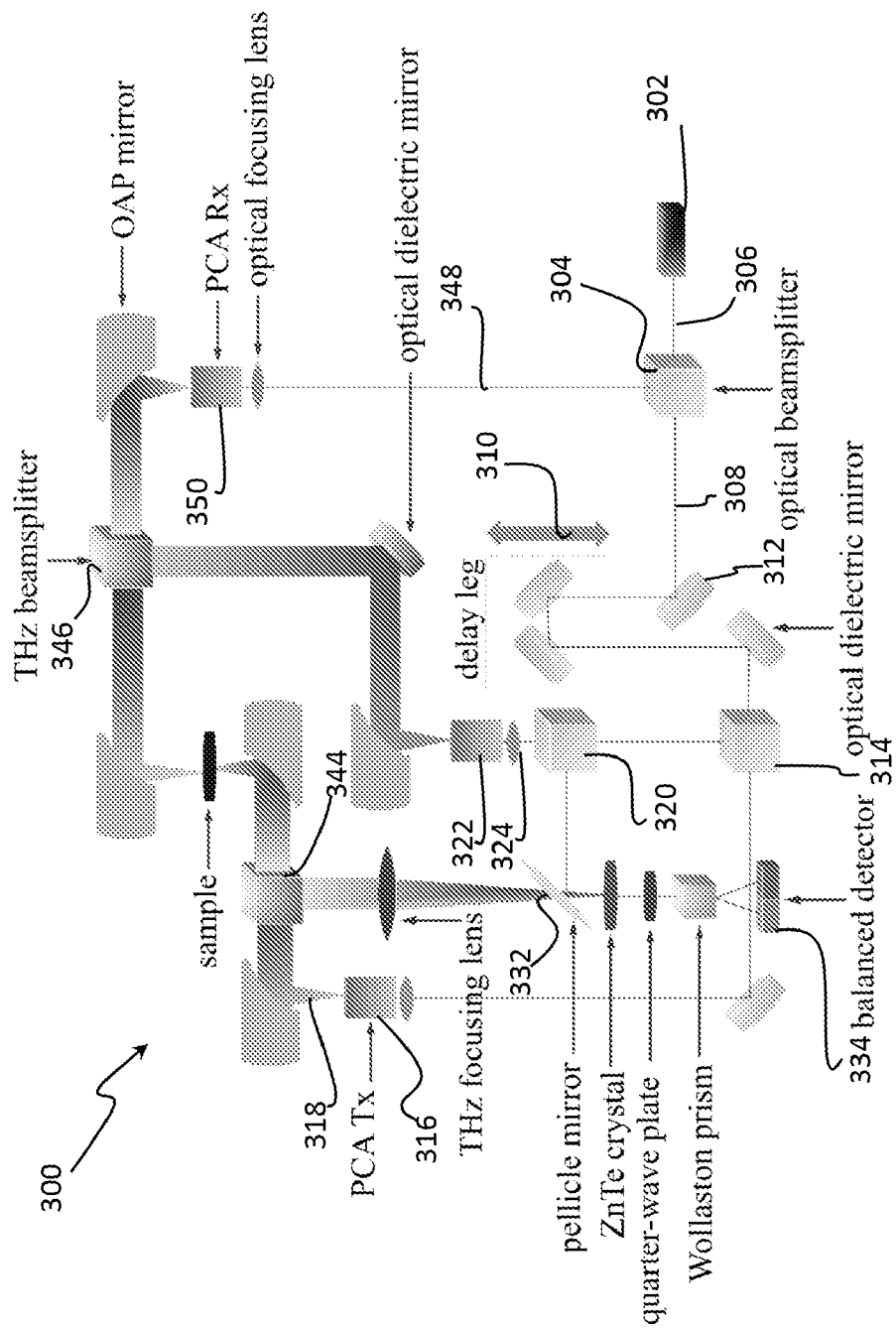
FIG. 7 shows an example fully integrated THz-TDS with multiple possible modes of transmission, reflection and imaging.

For instance, FIG. 7 shows an integrated THz-TDS subsystem 300 with multiple possible modes of transmission, reflection and imaging, according to another embodiment. The integrated THz-TDS subsystem 300 includes a femtosecond laser pump 302 and an optical beam splitter 304 disposed in a path of the laser pump to receive a generated optical laser beam 306 and emit a beam 348 along a first path to a PCA transmitter (PCA Tx) device 350, which generates a terahertz wave 318 provided to the sample 102. Along a second path 308, a delay leg 310, including a series of optical dielectric mirrors 312 and to another beam splitter 314, is positioned. The beam splitter 314 in turn outputs first path to PCA receiver (PCA Rx) device 316 via optical focusing lens. PCA Rx 316 is concurrently activated by terahertz beam 318. This provides an example transmission mode of THz-TDS. The beam splitter 314 outputs a second path to another beam splitter 320. Beam splitter 320 leads one path that outputs to a pellicle mirror 332. The combined terahertz wave from terahertz beam splitter 344 and optical beam at pellicle mirror 332 is directed towards a ZnTe crystal for conversion of the terahertz waves into a detectable optical signal, which propagates through a quarter-wave plate and a Wollaston prism to a balanced detector 334. This provides an example imaging mode of THz-TDS.

The second path from the optical beam splitter 320 leads to and activates another PCA receiver (PCA Rx) device 322 via an optical focusing lens 324. PCA receiver 322 also receives terahertz waves reflected off another sample, which is incoming from terahertz beam splitter 346. This provides an example THz-TDS operation in a reflection mode.

The integrated THz-TDS subsystem allows concurrent transmission, reflection, and imaging modes.

Figure 8:
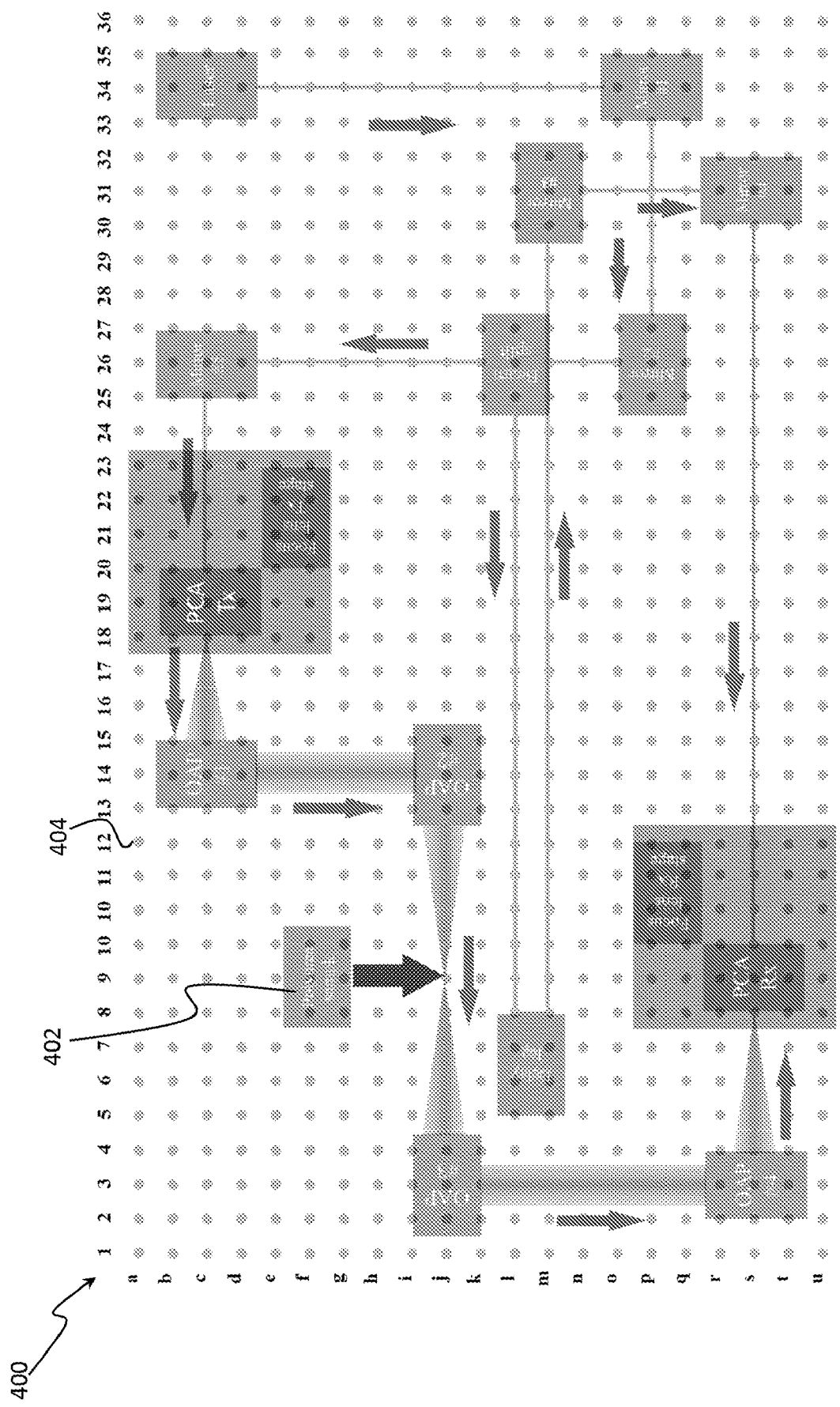
FIG. 8 illustrates example schematics of a Terahertz Time-Domain Spectroscopy (THz-TDS) layout on an optical table.
Figure 9:
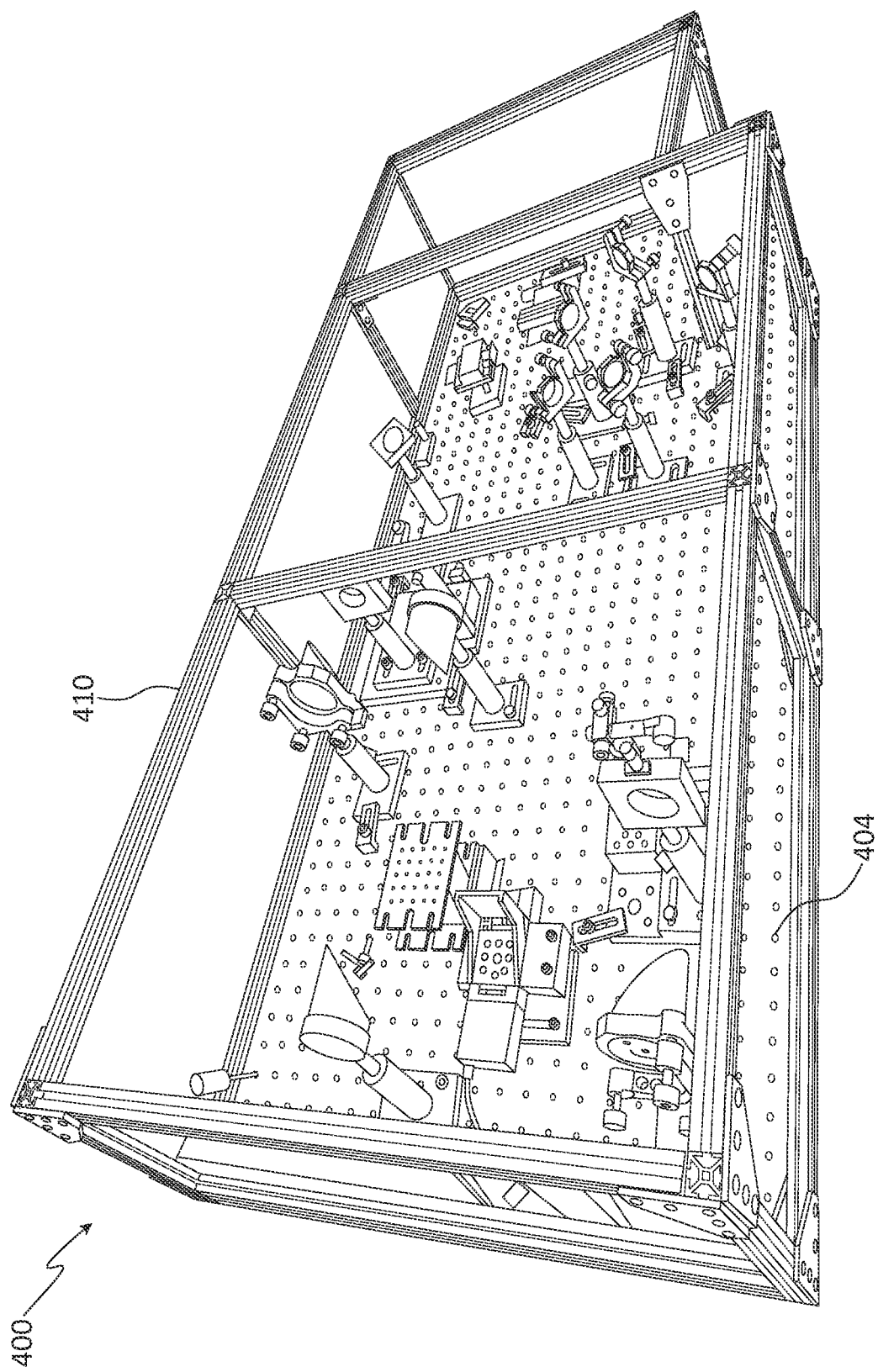
FIG. 9 is an image of a THz-TDS system integrated within a purged box to control moisture and oxygen.
Figure 10:
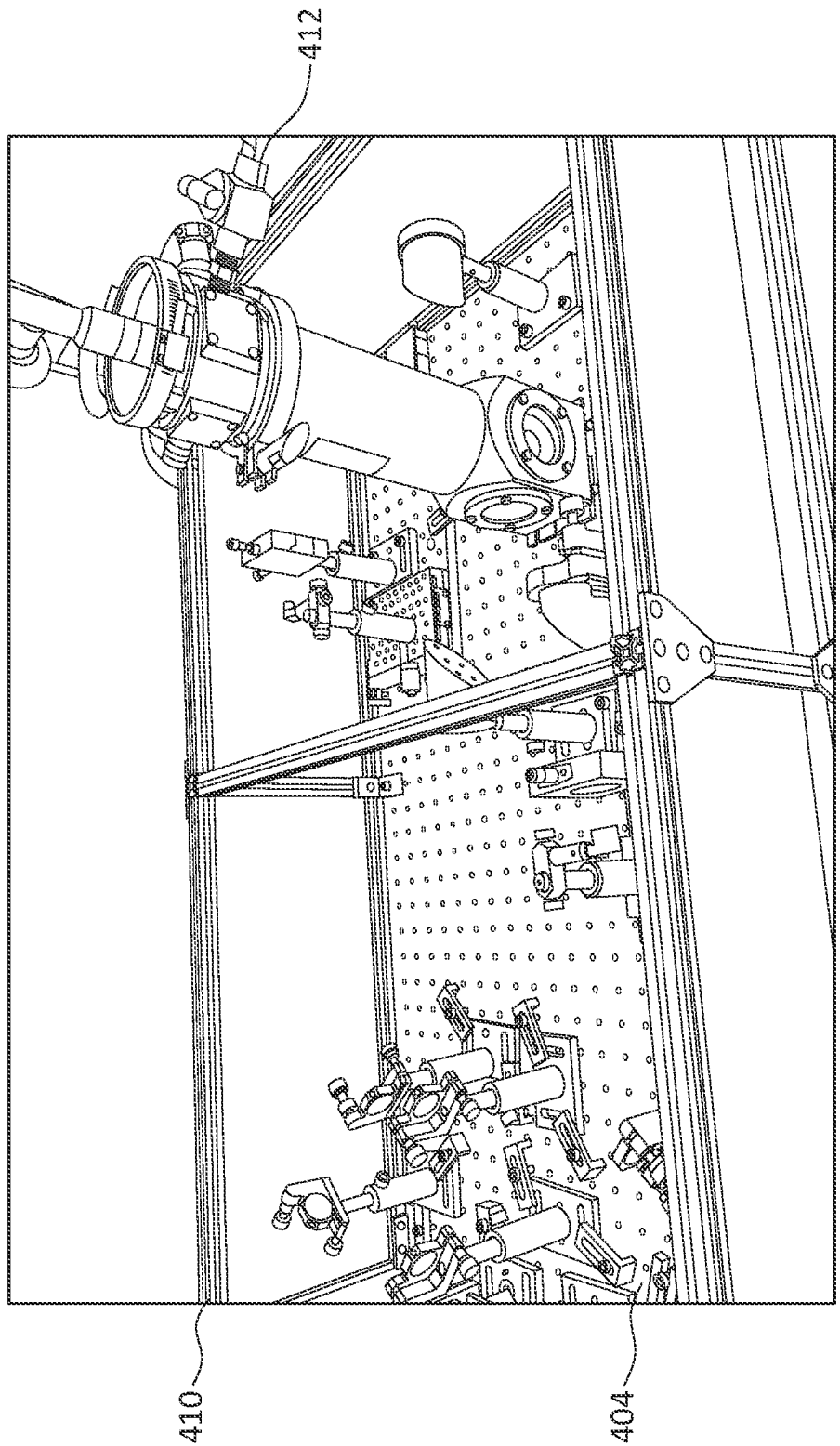
FIG. 10 is an image of a cryostat (temperature control subsystem) integrated with the THz-TDS and purged box.

Example subsystems have been designed and constructed, and are provided herein for illustration. FIG. 8 shows an example layout of a Terahertz Time-Domain Spectroscopy (THz-TDS) system 400 for testing a polyurea sample 402. The THz-TDS system 400 is disposed, e.g., mounted, on an optical table 404, which optical table was incorporated within a chamber 410, as shown in FIG. 9. FIG. 10 shows an integrated temperature control subsystem 412 within the THz-TDS system 400.

Ex-Situ Spectroscopic Characterization Using THz-TDS

Example methods using an example terahertz time-domain spectroscopy (THz-TDS) system operated in a transmission mode have been used to investigate residual effects of thermal and mechanical loading on polyurea elastomer after submersion in cryogenic and quasi-static loading conditions.

Polyurea is an elastomeric material with exceptional physical properties, including high stretchability, high tear and tensile strength, and moisture and chemical resistance. Despite decades of research, polyurea elastomers still attract significant analytical, computational, and experimental investigations spanning over a wide range of length and time scales. Polyurea has been actively investigated for numerous applications, of which impact mitigation in a variety of environmental conditions has been a prime focus.

In an attempt to further enhance the impact performance of polyurea, investigation has taken place of the mechanical properties of reinforced polyurea matrix composites using carbon nanotubes, fly ash, and polyurea microspheres, reporting various degrees of improvement at the local deformation resistance but with no appreciable overall enhancements. In general, the performance of polyurea in impact scenarios is attributed to (1) the strain rate sensitivity, and (2) the microstructure composing of interpenetrating hard and soft segments. It has been reported that composition plays a role in the high strain response of polyurea by altering the post-yield hardening behavior.

The mechanical behavior of polyurea has been heavily investigated in response to different environmental and loading conditions experimentally, including a wide range of strain rates, temperatures, salinity, and ultraviolet radiation. As the tensile strain rate increase, polyurea exhibits phase transition from the rubbery to the glassy regimes passing through the leathery region, depending on the testing rate, where the strain-to-failure decreased while yield stress and ultimate failure stress increased. However, there is a gap in the knowledge pertaining to the residual effect of mechanical and thermal loadings on polyurea microstructure, potentially compromising its long-term reliability in repeated loading scenarios.

Example systems and methods herein including THz-TDS can be used to examine the optical and mechanical response of an elastomeric material under mechanical stresses. The resulting time-domain signals at different applied stresses can be used to elucidate subtle changes in the elastomer microstructure through an investigation of the temporal characteristics of the terahertz wave interacting with the samples. This can provide physical evidence of mechanically stress-induced conformational changes of polymers, signified by changes in the complex index of refraction. While being a macroscopic property, the latter can also be used to reveal microscopic properties such as the change in the polarizability using Lorentz-Lorenz and Clausius-Mossotti relations.

Experiments will now be described using example methods to study the change in the molecular structure of polyurea after thermal and mechanical loading by examining optical properties in the form of the complex refractive index. One set of samples with a thickness of 1661±25 µm was separately tested under uniaxial tension and cryogenic isothermal condition. Another set of polyurea samples with different thickness of 497±65 µm was also tested under the same testing conditions. All samples were then examined using THz-TDS.

Experimental Protocol

Polyurea sheets with different thicknesses were manufactured using a slab-molded technique, where the chemical constituents, diisocyanate (DOW Industrial, Isonate® 143L), and oligomeric diamine (AirProduct Inc., Versalink® P1000), were mechanically mixed with a 1:4 weight ratio, respectively. The sheets were first cured in ambient conditions for 24 h, and then in a vacuum oven at 80° C. for an additional 24 h. The average thickness of one sheet was 1661±25 µm, while the average thickness of the second sheet was 497±65 µm, in what is referred to hereafter as 'thick' and 'thin' samples, respectively. Discs of 25.4 mm diameter were die cut using a hydraulic press from an area with consistent thickness from each sheet. A disc specimen from each sheet was neither mechanically nor thermally loaded, referred to herein as the virgin samples. Thick and thin polyurea discs were soaked in liquid nitrogen (LN$_2$) for 180 min and 60 min, respectively, to where the discs reached isothermal condition. The long soaking time was chosen to ensure thermal equilibrium even though the time required to reach isothermal condition was calculated to be only a few seconds based on the submersion condition and the thermal conductivity of polyurea (taken to be 0.16 W/mK). Notably, this thermal loading condition resulted in a thermal strain of 4.38% using a thermal expansion coefficient of $2 \times 10^{-4}$/K. Upon removal from the LN$_2$ bath, the samples were left to reach ambient conditions naturally for 240 min before being investigated using THz-TDS.

Figure 11:
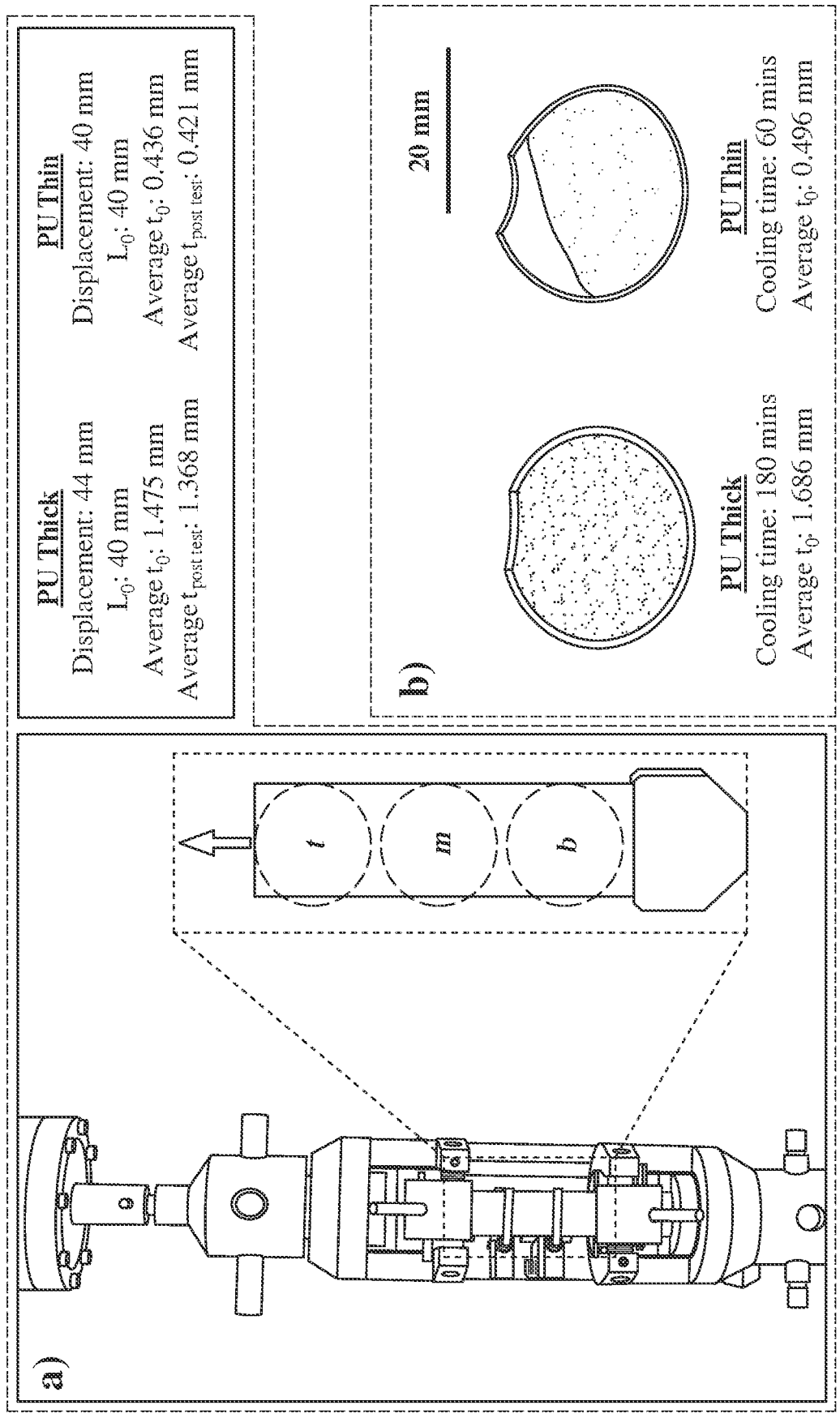
FIG. 11 shows: (a) Mechanical testing of polyurea strips using Instron 5843 load frame up to 100% strain also showing schematic of extracted discs from the load region, and (b) image of thermal loaded polyurea samples.

For mechanical tensile loading, polyurea strips with dimensions of 10.16 cm long×2.54 cm wide were cut out from the same sheets. The 10.16 cm×2.54 cm samples were loaded using an Instron 5843 load frame with a ±1 kN load cell, and the strain was measured using an Instron 2603-84 large strain extensometer, where the samples were loaded in tension to a maximum strain of 100%. The corresponding maximum forces applied to the thick sample and thin sample were 258 N and 84 N, respectively. Upon removal from the load frame, three discs with a 25.4 mm diameter were removed from the loaded region of the stretched polyurea strips, as seen in FIG. 11 (left). The straight edge in each sample (shown in FIG. 11) was used to ensure the direction of loading coincided with the direction of terahertz propagation during spectroscopic investigation. The virgin, thermally, and mechanically loaded discs were fitted into mounts with an inner diameter of 25.4 mm to eliminate any tilt or misalignment during the measurement acquisition using THz-TDS. The specimen discs were lightly clamped between the surface of the mount on one side and a retaining ring on the other. This mounting method facilitated the handling and placement of each specimen during THz testing, where the focal point of the terahertz beam was guided to the center of the specimen, avoiding any obstruction.

Figure 12:
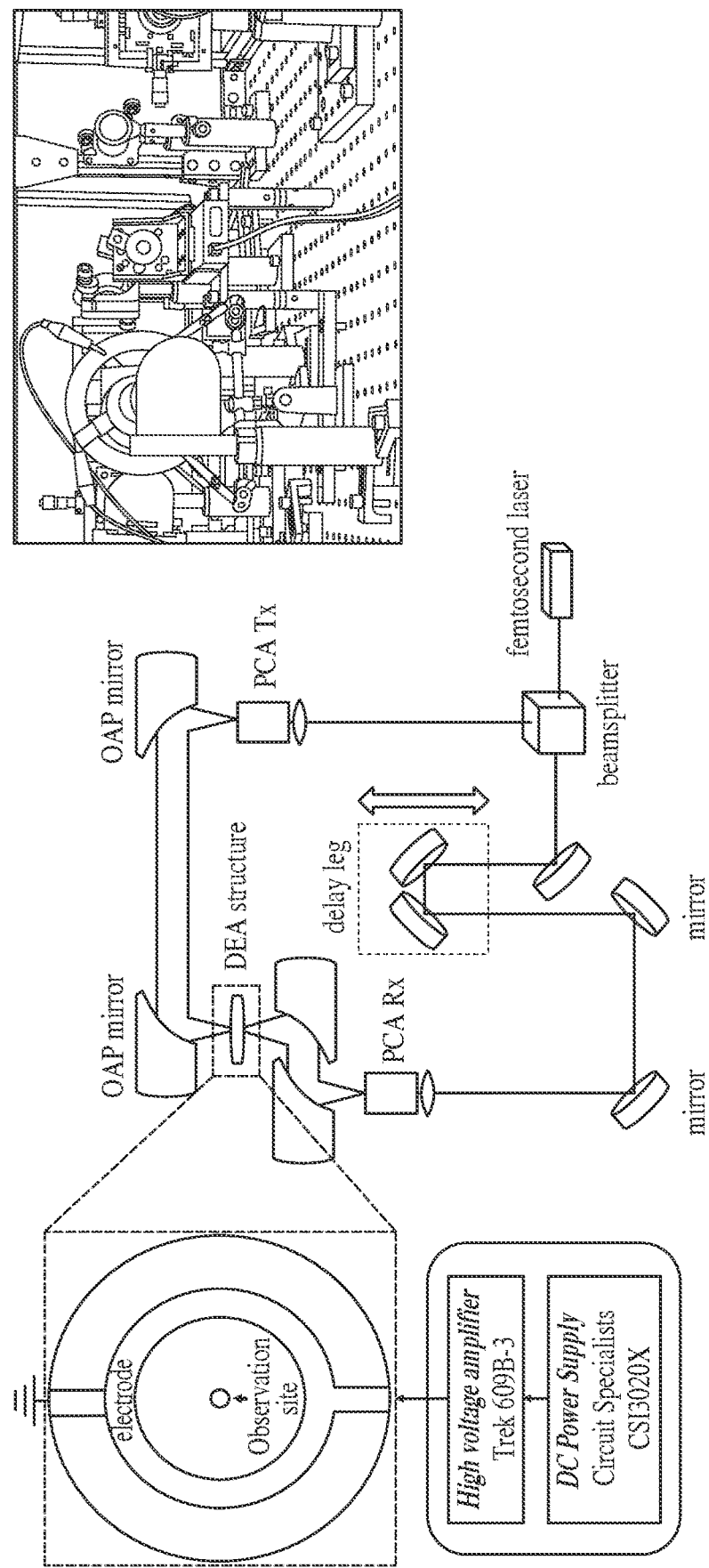
FIG. 12 shows: (a) Schematic of the polyurea sample mounted at the focal point of THz beam for interrogation of optical properties of virgin, thermally, and mechanically loaded conditions, (b) image of the built-in house THz-TDS system (inset shows a polyurea sample mounted during terahertz testing).

A schematic of the sample situated in the terahertz time-domain spectroscopy can be seen in FIG. 12. In the THz-TDS setup, a laser source of pulsed femtosecond beam (e.g., Menlo Systems, ELMO 780 HP) is split by a beam splitter into two different paths. The laser beam from the first path was focused on the active area of a photoconductive antenna transmitter (PCA Tx) (e.g., TeTechS, T-Era-100A-800) to generate terahertz waves. Once the THz wave propagated through the sample, located within the THz path, the signal was measured using a PCA receiver (PCA Rx) (e.g., TeTechS, T-Era-20D40P-800). At the same instant, the delayed laser beam from the second path of the beam splitter activated the receiving photoconductive antenna converting the terahertz waves into a measurable electrical signal, which was recorded using a lock-in amplifier (e.g., Stanford Research Systems, SR830) and build in-house data acquisition system. The collected time-domain data was transformed into the frequency-domain using a fast Fourier transform (FFT). The frequency-domain data was used to calculate the real part of the refractive index and absorption coefficient using Eqn. 3 and 4, respectively.

$$n(f) = 1 + \frac{c[\varphi_{sample}(f) - \varphi_{reference}(f)]}{2\pi f d} \quad (3)$$

$$\alpha(f) = -\frac{2}{d}\ln\frac{[n(f)+1]^2|\hat{E}_{sample}(f)|}{[4n(f)]|\hat{E}_{reference}(f)|} \quad (4)$$

where, n and α are the refractive index and absorption coefficient of the sample, respectively, d is the measured thickness of the sample and c is the speed of light in vacuum. $|\hat{E}_{reference}|$ is the complex amplitude of the reference while $|\hat{E}_{sample}|$ is the complex amplitude of the sample. $\varphi_{reference}$ and $\varphi_{sample}$ are the phase of the reference and sample spectra, respectively.

Results

Figure 13:
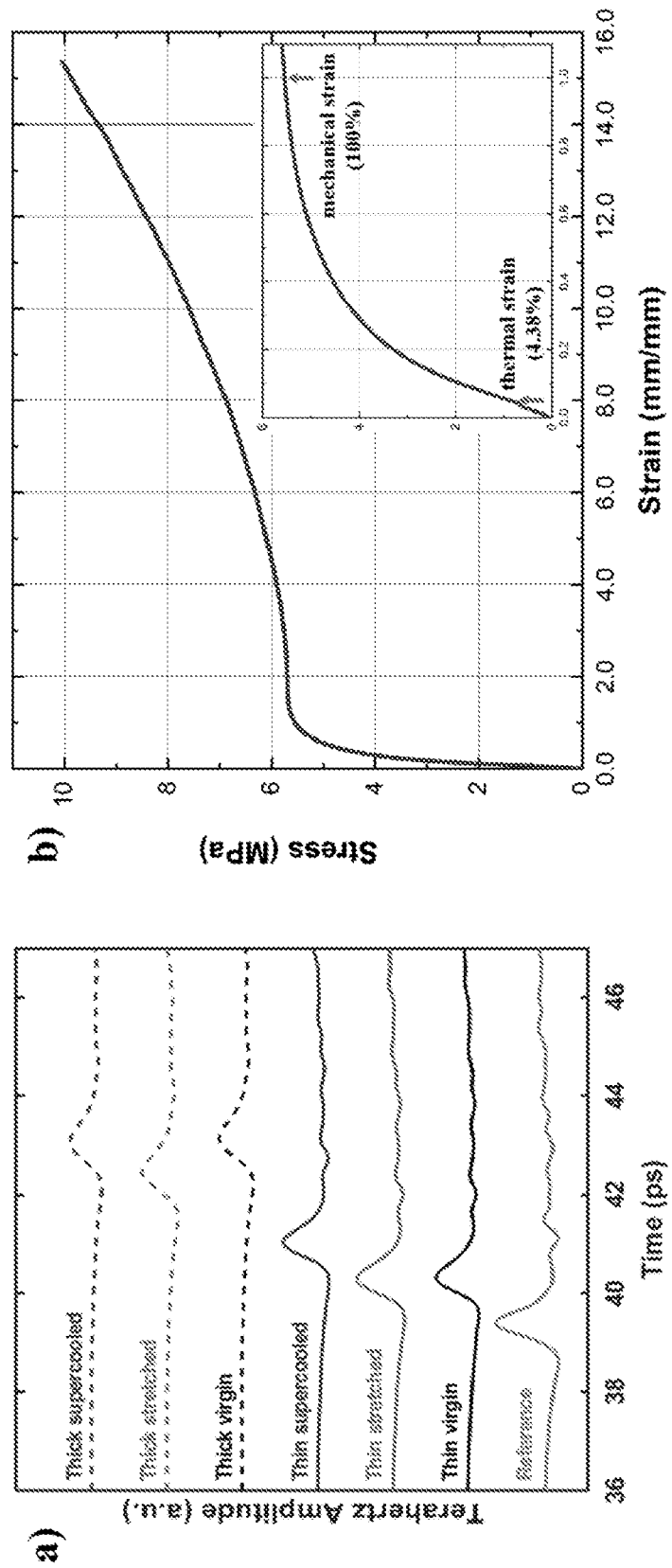
FIG. 13 shows: (a) THz time-domain signal of sample-free (reference), thick, and thin (virgin, thermally and mechanically loaded), and (b) typical engineering stress-strain curve of polyurea tested at a strain rate of $0.016$ $s^{-1}$.

FIG. 13(a) shows the THz time-domain signals of thermally and mechanical loaded samples compared to their virgin counterparts, and the sample-free, reference signals. The primary wave characteristics of interest are summarized in Table 1, below, including the average thickness (post-loading thickness is reported for thermal and mechanical samples), the peak amplitude, and the delay time. The calculated optical and electrical properties are also included in Table 1. The notable reduction in amplitude and temporal shift in all the signals are a result of the convoluted effect of the thickness and the change in the index of refraction. For example, when comparing the reference (magenta solid line) with the thin (black solid line) and thick (black dotted line) virgin signals, the peaks appeared at 39.40 ps, 40.32 ps, and 43.13 ps, marking the temporal delay in arrival of $t_{thin}$=0.9167 ps and $t_{thick}$=3.7333 ps, respectively. The average thickness of the thin samples was 476 µm while the thick samples were 1686 µm, representing nearly a threefold increase ($d_{thin}/d_{thick} \approx 0.28$), which is commensurable with the ratio of the time delay ($t_{thin}/t_{thick} \approx 0.25$). The disparity between these ratios signifies the contribution of the thickness-dependent change in the index of refraction. The real part of the refractive index (n) is related to the delay time, the thickness, and the speed of light (c) in vacuum, where n=1+ct/d. Therefore, the real refractive index of polyurea is estimated to be 1.66 and 1.58 for thick and thin samples, respectively, using the attributes of the time-domain signals in Table 1. Similarly, the rest of the temporal characteristics are used to estimate the imaginary part of the refractive index (a measure of the absorption coefficient), water respectively. The complex refractive index of thick and thin samples was found to be 1.66+i0.06 and 1.58+i0.02 using the respective THz time-domain signals. In all, and regardless of the sample thickness, the thermal loading had a negligible residual effect, signifying the utility of polyurea over a broad range of temperatures.

TABLE 1

Summary of the characteristics of the THz time-domain signals extracted from FIG. 13a.

| Testing Conditions | | Ave. thickness (μm) | Peak amp. (V) | Delay (ps) | n | κ | ε |
|---|---|---|---|---|---|---|---|
| | Reference | — | 0.6292 | — | — | — | — |
| Thick PU | Virgin | 1686 | 0.3087 | 3.7333 | 1.6638 | 0.0677 | 2.7729 |
| | Supercooled | 1674 | 0.2938 | 3.6667 | 1.6567 | 0.0760 | 2.7503 |
| | Stretched | 1368 | 0.3365 | 3.0500 | 1.6684 | 0.0537 | 2.7864 |
| Thin PU | Virgin | 476 | 0.4286 | 0.9167 | 1.5774 | 0.0207 | 2.4886 |
| | Supercooled | 496 | 0.4635 | 1.0778 | 1.6514 | 0.0038 | 2.7273 |
| | Stretched | 421 | 0.4826 | 0.9000 | 1.6409 | −0.0020 | 2.6925 |

$$\kappa = \ln\left(\frac{2}{(n+1)}\frac{A_R}{A_S}\right)$$

is based on the amplitude of the sample ($A_S$) and the reference ($A_R$) signals. Here, κ was defined based on the concept of the logarithmic decrement while considering the Fresnel coefficient in the case of total transmission. The imaginary part of the index of refraction for thin and thick polyurea are 0.0207 and 0.0677, respectively, since the amplitude of the time-domain signals were found to be 0.4286 V and 0.3087 V while the amplitude of the reference was 0.6292 V.

The optical properties, in terms of the complex refractive index, were then used to compute the dielectric function (ε) of polyurea, since $\varepsilon = (n+i\kappa)^2$. The dielectric constant (|ε|) of thick and thin virgin polyurea samples was found to be 2.77 and 2.49, which is in reasonable agreement with the constants measured using the electrical method and reported to range between 3.5-4.2, depending on the preparation method (including the stoichiometric ratio and the type of diamine and isocyanate), temperature, and frequency.

The strain percentage due to thermal loading by supercooling the sample in an LN2 bath and then bringing it back to ambient temperature was estimated to be 4.38%, based on the difference in temperature and the thermal expansion coefficient. This low strain level was within the linear elastic region of the mechanical response of polyurea, which can be confirmed by projecting this low strain percentage on the engineering stress-strain curve shown in FIG. 13b. That is, the loading is thought to be completely reversible; hence, the residual stress and strain effects can be considered to be minimal in the case of thermal loading. The negligible residual effect was also captured in the THz time-domain signal by comparing the data of virgin and thermally loaded samples. For the thick samples, the peak amplitude and time delay changed by 4.8% and 1.8%, respectively, indicating the reversibility of the deformation. Similarly, the THz signals of the virgin and supercooled thin polyurea samples were also similar. The peak amplitude of the thin samples was 0.4286 V and 0.4635 V for the virgin and thermally loaded samples with time delay of 0.9167 ps and 1.0778 ps, In the case of mechanically loading the samples up to 100% strain, analysis of the THz time-domain signals reported a notable difference, indicating that the residual effect is present while signifying irreversibility. The samples were characterized using THz-TDS, on average, two hours post loading. Examining the time-domain signals in FIG. 13a and the summary of the major attributes in Table 1, it is noted that the thickness has exhibited a reduction of 18.8% and 11.5% for thick and thin samples, respectively. The remnant set in thickness is attributed to the relatively short duration between testing and spectroscopic characterization, not providing ample time for full recovery based on the viscoelastic properties of polyurea. The mechanical loading at 100% strain corresponds to the engineering stress of 5.5 MPa, which is nearly twofold higher than the reported yield stress. Additionally, the amplitude of the terahertz time-domain signal increased, regardless of the thickness of the tested samples. On average, the amplitude of the thin samples increased by 12.6% and by 9% for the thick samples, when compared with the signal amplitude of the virgin samples. The amplitude growth was accompanied by a reduction in the time delay, where it was found to be 0.6833 ps and 0.0167 ps for the thick and thin samples, respectively. As discussed above, the amplitude and time delay changes are generally associated with a change in the complex refractive index. Correspondingly, the latter was calculated to be 1.67+i0.05 and 1.64-i0.002, which is greater than the complex index of refraction for the virgin samples reported above. It is believed that the post-loading index represents a change in the molecular structure that resulted in less attenuation and dispersion of the THz electromagnetic wave as it propagates throughout the samples.

The essence of spectroscopic investigations is based on the existence of a set of molecular vibrational modes due to the interaction between the propagating electromagnetic waves and the material. The oscillations of the different bonds within the materials signify the final utility of the time-domain data in terms of the quality factor (Q), which is defined herein as the ratio between the energy of the reference signal to the energy of the sample signal. The former represents the stored energy in the terahertz pulse, while the latter accounts for the dissipated energy due to the damped oscillations of the vibrating bonds observed by the propagating terahertz pulse as it interacts with the sample.

Figure 14:
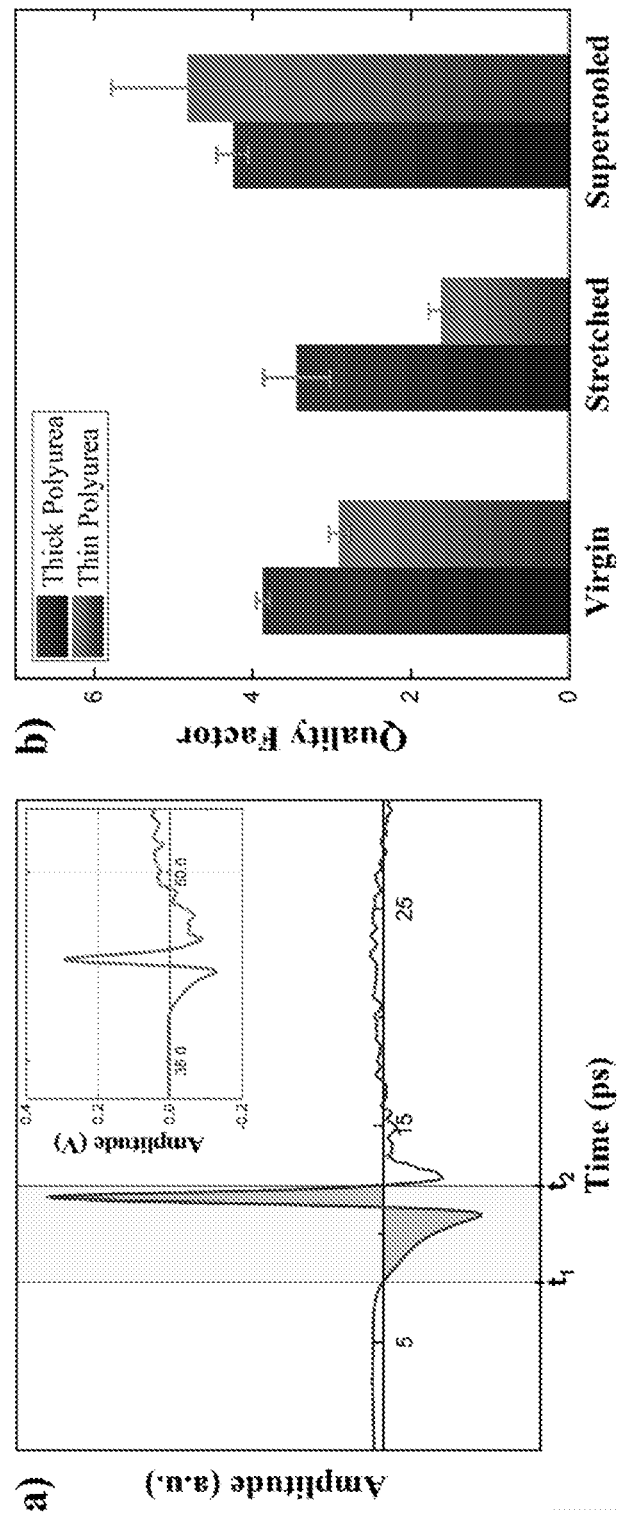
FIG. 14 shows: (a) schematic representation showing the steps to calculate the quality factor from a terahertz pulse (inset is an actual signal), and (b) the Q values of polyurea samples with different thickness and testing conditions.

The calculations of Q are shown schematically in FIG. 14a and Eqn. 5 by considering the total area under the reference THz pulse $$\left(\int_{t_1^r}^{t_2^r} E_r(t)dt\right)$$

and sample THz pulse $$\left(\int_{t_1^s}^{t_2^s} E_s(t)dt\right).$$

$$Q = 2\pi \frac{\int_{t_1^r}^{t_2^r} E_r(t)dt}{\int_{t_1^s}^{t_2^s} E_s(t)dt} \quad (5)$$

FIG. 14b shows the results of the quality factor of thick and thin samples for the virgin, stretched, and supercooled samples. It can be determined that thickness plays a measurable role due to the attenuation and dispersion of the waves within the material, where the difference in Q was found to be 33% when comparing thin and thick virgin samples. The disproportionality of Q and thickness is attributed to the changes in the complex index of refraction. Second, mechanical loading tends to increase bond oscillation dampening since the Q values for the loaded thick and thin samples were smaller than their virgin counterparts by 11% and 44%, respectively. Third, and on the contrary, supercooling the thick sample resulted in a significant decrease in dampening, manifested in an increase of 10% and 23% in Q values comparative to virgin and mechanically loaded samples. The submersion in cryogenic temperatures is thought to freeze the chains, increasing the bond stiffness while reducing energy dissipation due to dampening.

Figure 15:
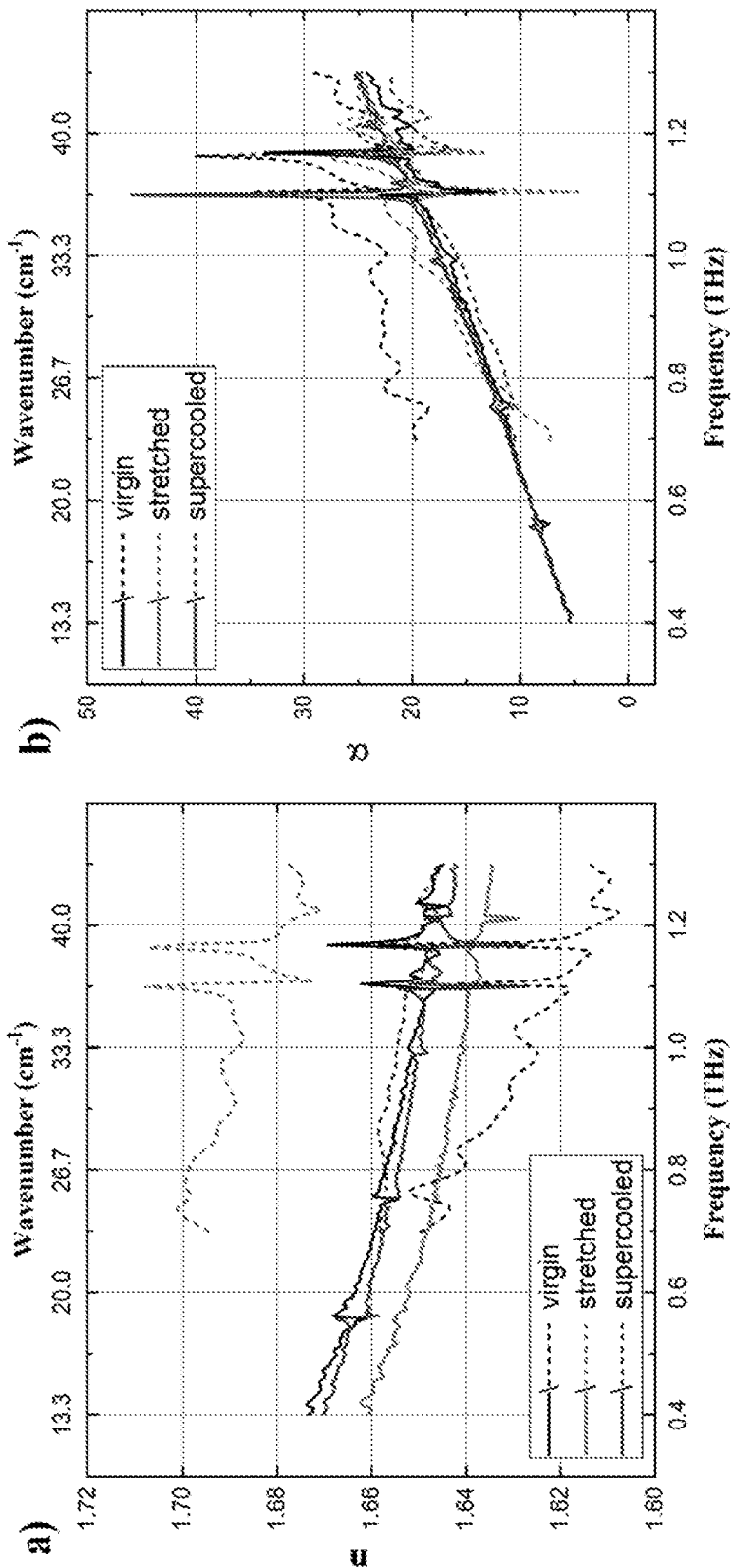
FIG. 15 shows: Result of (a) real refractive index and (b) absorption coefficient as a function of frequency and wavenumber. The optical properties for the thick (solid lines) and thin (dashed lines) polyurea samples were extracted over a range of 0.4-1.3 THz and 0.7-1.3 THz, respectively.

While analysis of the THz time-domain signals revealed some significant attributes of the samples, frequency-domain analysis can be applied to extract the complex refractive index as a function of frequency spanning over the bandwidth. The bandwidth is selected based on the power spectral response of the THz antennas as well as the stability of the frequency transformation algorithm. Here, the frequency range for the thick and thin samples were 0.4-1.3 THz and 0.7-1.3 THz, respectively. FIG. 15a shows the real part of the refractive index while FIG. 15b is a plot of the absorption coefficient of virgin, thermally, and mechanically loaded samples in two ranges of thicknesses. As concluded from the time-domain analysis, thermal loading results in an indifferent real part of the index compared to the virgin, where the difference is less than 0.2%, on average over the entire frequency range, for both thick and thin samples. Regardless of the testing conditions, the real part of the refractive index monotonically decreases with increasing frequency, while the absorption coefficient increases as a function of frequency. The frequency dependence of the refractive index is consistent with the description given in Eqns. 3 and 4, respectively, since the thickness was kept constant throughout the characterization using THz-TDS. On average, the refractive index of the thick and thin polyurea samples is relatively similar, where the latter is merely 0.02% greater than the former. The small variance in the values of the components of the index for different regiments of samples at a given frequency is attributed to the threefold difference in thickness, as discussed before. Generally, the dispersion and attenuation of waves in a media are strongly coupled to the thickness through the delay time of arrival, commonly captured by the quality factor, as discussed above. The values of the index of refraction calculated from the frequency-domain analysis, FIG. 15, is in good agreement with the time-domain analysis discussed above.

An advantage of the frequency-domain response is identifying terahertz spectral peaks associated with molecular vibrations of the investigated polymer since the erroneous peaks from the surrounding environment are eliminated during the analysis. The virgin thick polyurea samples reported spectral peaks at 0.56, 0.76, 0.95, 1.10, 1.17, and 1.21 THz, while the thin samples only showed peaks at the last three values. Comparing the chemical structure between crystalline urea and urea-linkage in the aromatic polyurea investigated, the latter is connected to a larger structure via aromatic benzene rings instead of hydrogen bonds, which may account for some of the spectral peaks seen in polyurea but not in the crystalline urea. Nonetheless, the good agreement of the 0.76, 1.10, and 1.21 THz absorption bands to prior results for corresponding bands supports that those features seen in the polyurea refractive and absorbance spectra are ascribed to the urea-linkages of the monomer chain. In all, the experimental results demonstrate that example THz-TDS methods can provide additional insights into the residual stress on the behavior of polymers.

Experiment—In Situ, Non-Invasive, Non-Destructive, Non-Contact THz-TDS

Additional experiments according to example methods provide an in situ probe of the mechanical properties of polymers using non-invasive, non-destructive, and non-contact terahertz (THz) spectroscopy. A dielectric elastomer actuator (DEA) structure is used as the loading mechanism to avoid obscuring the beam path of transmission terahertz time-domain spectroscopy. In DEAs, the applied voltage results in mechanical stresses under the active electrode area with far-reaching stretching in the passive area. Finite element analysis is used to model and simulate the DEA to quantify the induced stresses at the observation site over a voltage range spanning from 0 V to 3000 V. An example analysis technique is used based on the Hilbert-Huang transform to exploit the time-domain signals of the ultrathin elastomeric film and to overcome the limits set forth by conventional analysis techniques. Computational results show a nonlinear relationship between the effective stresses and the applied voltage. Analysis of the terahertz time-domain signals shows a shift in the delay times and a decrease in signal peak amplitudes, whereas these characteristics are implicitly related to the change in the index of refraction. Results signify the interrelationship between the conformational changes and applied mechanical stress.

Dielectric elastomer actuators (DEAs) have been emerging as a viable actuation mechanism since their initial inception in the mid-1990s. At its essence, DEAs leverage the compliant mechanical behavior of elastomers to achieve large deformation via the application of an electric field. When the latter is applied across the thickness of the actuator, it results in a localized compressive stress that affects the area surrounding the electrode region where the electric field was applied. The standard DEA configuration can be round or diamond geometry such that the electrode area is either circular or rectangular, respectively. While the former is used to generate out-of-plane axial deformation, the latter is used to induce a sizable in-plane displacement. A common shortcoming of such actuator configuration for the purposes of in situ characterization of the polymer response is the electrode area, where the entire surface of the insulator is covered with a flexible conductive material. Therefore, the presence of the conductive material impedes the direct propagation of electromagnetic waves used for characterization. In an example method, an annulus electrode geometry is employed since it provides a generous unobstructed portion of the sample surface. A biaxial state of stress can also be applied using an electric or mechanical camera shutter, although the leaves of the mechanism may obstruct the propagating electromagnetic wave while posing a challenge in inducing precise, remote control of the deformation.

To elucidate the molecular structure of polymers, scientists and engineers usually resort to ex-situ spectroscopy techniques such as microwave, Raman, and Fourier transform infrared spectroscopy (FTIR) operating between wavenumbers of 1 $cm^{-1}$ and 10 $cm^{-1}$ for the former, and 400 $cm^{-1}$ and 14000 $cm^{-1}$ for the latter two. The near and mid-infrared spectroscopy techniques are positioned for delineating the vibrational modes in the mid to high terahertz region, thus leaving the frequency vibrational modes associated with dynamic conformational changes in the low terahertz (THz) regime undetected. There is a well-known two-fold limitation of FTIR in the area of experimental and mechano-chemical characterization. First, FTIR is a surface spectroscopy technique with a penetration depth of 0.5 μm limiting the investigation to the first few layers of the material. Second, FTIR is unsuitable for integration of in situ dynamic mechanical characterizations since the sample must be stationary during the scan.

Terahertz-based spectroscopy techniques are emerging as not only supplementary but also essential tools for probing the fingerprint region of materials with a higher resolution than the current state-of-the-art techniques. Advantageous to the study of polymers (including biopolymers) is the safe level of electromagnetic radiation due to the low photon energy of the terahertz waves. That is to say, a propagating terahertz wave will be able to observe the intrinsic properties of matter without imparting any irreversible changes to the microstructure. Terahertz-based spectroscopy can be used to trace certain types of low-frequency vibrational characteristics, such as boson peaks, and inter- and intramolecular vibrational modes including translational lattice vibrations of C—C bond in methylene groups at 2.2 THz, strong damping in the amorphous region at 1.5 THz, vibrations due to the intermolecular hydrogen bonding of polyhydroxy butyrate (PHB) at 2.49 THz, and vibrations due to the helical structure along fiber axis of PHB at 2.92 THz, to name a few. Additionally, some mechanical properties have been investigated using terahertz, where the results are in excellent agreement with the current state-of-the-art (e.g., glass transition temperature using Differential Scanning Calorimetry). These hallmark characteristics of THz waves signify its suitability for integration in experimental mechanics studies, or in situ mechano-chemical experimentation.

Experiments using example methods and systems thus assess the behavior of elastomeric polymers by leveraging the advantages of dielectric elastomer actuator structures (DEA) and terahertz time-domain spectroscopy (THz-TDS). The former was used as the sample structure that was subjected to remotely controlled varying levels of stresses, while the latter was concurrently used as a non-invasive, non-contact, non-destructive bulk spectroscopy technique. An example analysis method is provided.

Experimental Protocol

The DEA structure was used to apply a varying amplitude mechanical stress remotely by changing the applied voltage across two parallel electrodes, whereas the observation site was characterized using THz-TDS operating in the transmission mode. A finite element simulation was used to quantify the stress in the observation site by replicating the experimental conditions in the solver environment.

Test Sample Structure

Figure 16:
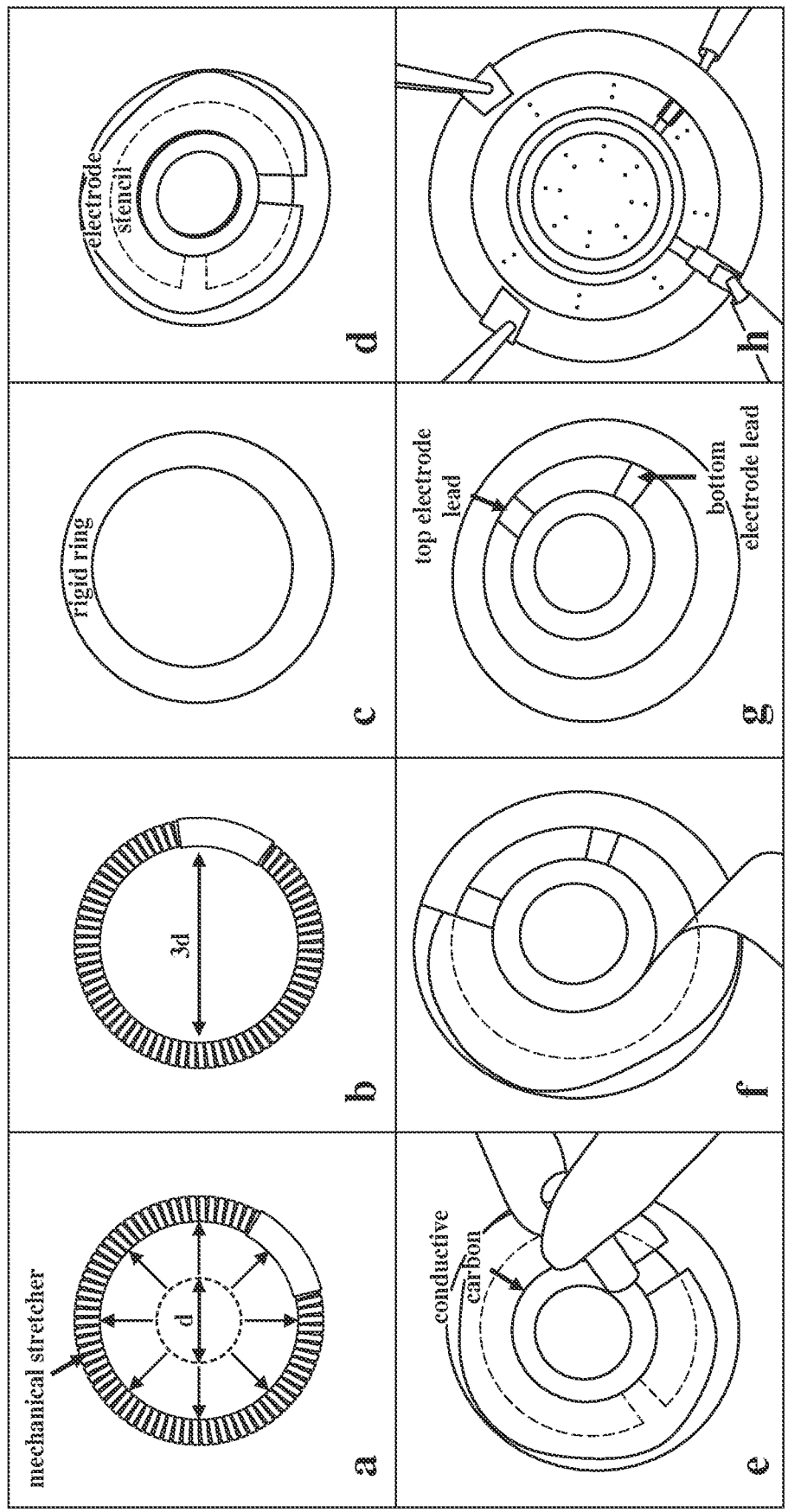
FIG. 16 shows: Fabrication steps of the DEA samples showing the initial stretching, deposition of the electrode, and the application of the electric field during testing.

Referring to FIG. 16, the DEA sample was provided by an elastomeric dielectric insulator film with areas covered with a flexible conductive material to apply an electric field across the thickness selectively. A double-sided acrylic tape (e.g., 3M™ VHB™ Tape 4905) with an as-received thickness of 0.5 mm was manually stretched from an initial diameter of 25.4 mm to a final diameter of 76.2 mm (FIG. 16a-b), which resulted in a film thickness of 30±6 μm (estimated from the time domain spectroscopy signals). Pre-straining the VHB has two advantages. First, by equibiaxially stretching the film, the thickness consequently decreases; therefore, a lower applied voltage is required to obtain the same mechanical response. Second, pull-in instability can be avoided by pre-straining the film, which is kept in tension and effectively avoids buckling. The pull-in failure mode occurs when the Maxwell pressure exceeds the third principal compressive stress of the elastomeric film.

After the elastomer film was stretched, it was then attached to a rigid plastic ring (FIG. 16c) with a 76 mm ID and 102 mm OD to avoid inducing unintended external strains during testing and data collection, while providing appropriate mechanical boundary conditions for proper operation of the actuator. Templates of the electrode configuration (FIG. 16d), including the lead locations, were prepared a priori by printing on a single-sided adhesive paper that was used as a mask during the application of the conductive graphene powder (e.g., AZ Laboratories, Ultra Conductive Graphene Powder) to both sides of the adhesive elastomer (FIG. 16e-f). Since the VHB film exhibits intrinsic tackiness, the conductive graphene powder stuck to the surface upon lightly tapping the powder using a foam applicator. Upon removal of the mask, the conductive electrodes were revealed (FIG. 16g), and two copper tape strips, which were used as conductive leads to connect the applied field to the active electrode area, were then attached (FIG. 16h).

To actuate the DEA, a positive DC voltage was applied to one side of the VHB film while the other side was grounded using a DC power supply (e.g., Circuit Specialists, CSI3020X) and a high-voltage amplifier (e.g., Trek 609B-3). The spot size of the THz wave is <<3 mm, which was focused at the middle of the sample. At 1 THz, the beam diameter of the terahertz propagating wave is ~300 μm. The remoteness of the THz characterization site with respect to the inner diameter of the electrode (38 mm) excludes the effect of the electric field on the spectroscopy THz wave. Furthermore, the self-boundedness of the electrode geometry indicates that the effect of the electric field is localized and limited to the active electrode area. the bounds of applicability may be determined, relating the inner diameter of the electrode to the attributes of the THz wave. The applied voltage ranged from 0 V (used thereafter as the control) up to a voltage where the mechanical failure occurred (exhibited by the tearing of the VHB film due to localized wrinkling around the electrodes). On average, after performing the same testing protocol on seven different DEA samples, the mechanical failure corresponded to approximately 3250 V, and this voltage and the pre-stretched ratio construed that the VHB was marginally stable to guard against pull-in failure. The tearing of the film occurred due to the straightening and unfolding of the polymer chains. The applied voltage was increased at an increment of 250 V. In all, seven DEA samples were constructed and tested until mechanical failure.

Terahertz time-domain spectroscopy (THz-TDS) was set up in transmission mode to facilitate the objective of in situ characterization of the stressed-area in the middle of the DEA sample, referred to as the observation site, where the VHB sample was situated at the focal point of the terahertz beam path with a spot size of 300 µm at 1 THz. It is important to note that the area of observation for the investigation using terahertz was not obstructed by the electrode materials or the leads shown in FIG. 16. The schematic of the transmission mode of the terahertz time-domain spectroscopy was similar to that used in the above-described THz-TDS experiment.

Referring again to FIG. 12, in this experiment, a pulsed femtosecond laser with a pulse width of <150 fs was split into two different paths. The first path of the optical beam was focused on a photoconductive antenna transmitter (PCA Tx, TeTechS, e.g., T-Era-100A-800) to generate terahertz waves. The transmitter PCA was biased with 45 $V_{pp}$ square wave of 8000 Hz using a square wave generator (e.g., TeTechS Square Wave Generator). Using a series of off-axis parabolic (OAP) mirrors, the emitted terahertz beam was first focused onto the observation site of the sample. The refraction from the sample was then collimated and focused onto a photoconductive receiver antenna (PCA Rx, e.g., TeTechS, T-Era-20D40P-800) at the same instant the delayed second half of the optical beam activated the photoconductive receiver to convert the terahertz waves into a measurable electrical signal. The signal was measured using a low-noise amplifier (e.g., TeTechS, LNA) and was recorded using a built in-house data acquisition system. The collected data underwent time-domain signal analysis, noting that the changes in the attributes of the terahertz pulse are implicitly associated with the complex index of refraction. The time-domain signals at each level of applied electric field were analyzed to report the amplitude, full-width half maximum (FWHM), the 0-100% rise time, and the time-delay between the arrival of the reference time signal (referring to sample-free, baseline measurement) and the signal of the VHB at the observation site.

Stress Estimation Using Finite Element Simulation

Figure 17:
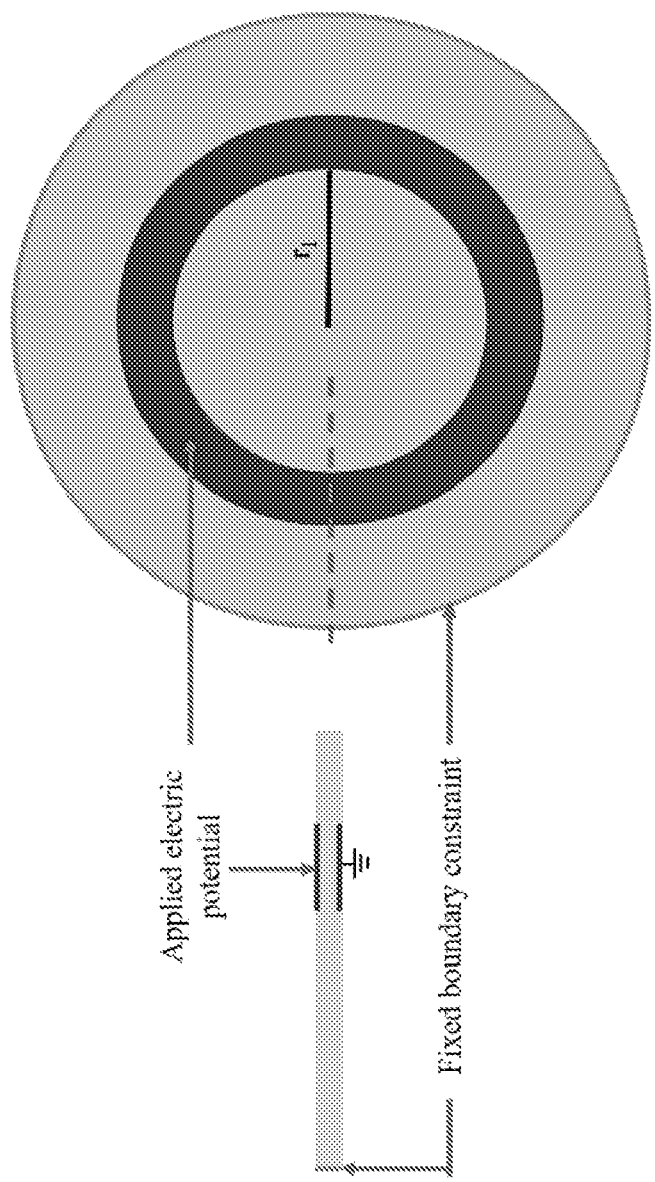
FIG. 17 shows: Schematic representation of the FEA model showing the boundary conditions.

The full-field state of stress at the observation site was estimated using a finite element simulation based on the Maxwell stresses developed under the surfaces of the electrode. That is to say, the application of an electric field across the thickness of the stretched VHB film resulted in the accumulation of opposite polarity charges at the electrode surfaces; hence, it attracted them closer to each other and induced localized compressive stresses that resulted in the reduction of the thickness under the electrode, which in turn causes an increase of the thickness of the middle area of the DEA. At the onset, a geometry analogous to that of the sample used in the physical testing (FIG. 17) was modeled in the finite element analysis (FEA) environment (e.g., Comsol Multi-Physics®) with a fixed constraint boundary condition applied to the most outer perimeter of the DEA sample resembling the rigid plastic ring used in the experiment to prevent rigid-body motion and external deformation. The boundary conditions are shown on FIG. 17. The VHB continuum was spatially discretized using a linear element with an average element size of 3 mm, whereas the thickness direction had at least two scaled elements. It is worth noting that the computational model can be simplified using axisymmetric assumptions, however, a full model was solved herein given the low required computational power.

Following the work of Pelrine R E, Kornbluh R D, Joseph J P (1998) Electrostriction of polymer dielectrics with compliant electrodes as a means of actuation. Sensors Actuators, A Phys 64:77-85, the electrostatic pressure ($p_{es}$) due to the applied electric field was converted a priori to an elastic compressive force ($p_e$) such that $$p_e = -p_{es} = -\varepsilon_r \varepsilon_o (U/t)^2 \quad (6)$$

where, $\varepsilon_r$ is the relative dielectric constant of the VBH material (taken to be 3.2), $\varepsilon_o$ is the free-space permittivity ($8.85 \times 10^{-12}$ F/m), U is the applied voltage ([0:250:3500] V) at the conductive electrodes across the thickness, and t is the thickness of the stretched film. The elastic compressive force ($p_e$) was then parametrically applied on the electrode area in lieu of the electric field. In short, Equation 6 provides two alternative approaches to accomplish the same applied pressure via changing the electric field, namely, reducing the thickness or increasing the applied voltage. The latter approach was adopted in example methods.

Given the stretchability of the VHB materials, the above FEA model was then resolved by prescribing the material to obey hyperelasticity following the incompressible Yeoh model, whereas the strain energy density function (W) is given by $$W = C_{10}(I_1-3) + C_{20}(I_1-3)^2 + C_{30}(I_1-3)^3 \quad (7)$$

where, $I_1$ is the first invariant of the left Cauchy-Green deformation tensor, and $C_{10}$, $C_{20}$, and $C_{30}$ are material parameters determined by fitting the experimental data of the material to the stress expression derived from the energy potential, which were taken to be 80.3, -0.765, and $9.84 \times 10^{-3}$ kPa, respectively. The third-order dependence on the first invariant is a characteristic advantage of the Yeoh model enabling higher accuracy while avoiding instabilities associated with other hyperelastic models, i.e., Yeoh model is Drucker stable since it has no dependence on the second invariant. The latter is justified since the free energy of elastomers (as it is the case herein) is weakly dependent on the second invariant. In all, the FEA simulation is an uncoupled hyperelastic-electrostatic model, which has been previously reported to adequately represent the behavior of the DEA structure.

Results

Figure 18:
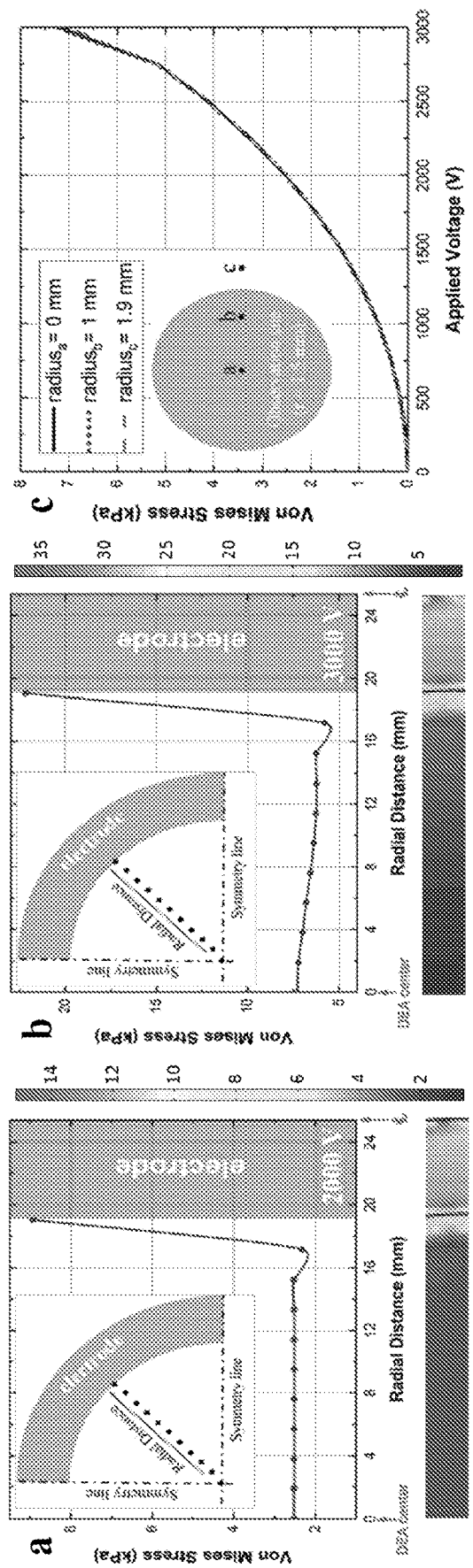
FIG. 18 shows: Computational results from the DEA finite element simulation showing the (a) contour surface plots of the effective Von Mises stresses at different applied voltages, (b) Von Mises effective stress as function of the radial location from the center of the DEA to the edge of the electrode active area, and (c) Von Mises effective stress in the vicinity of the THz observation site as a function of voltage.

While it is known that the applied voltage on the electrode area in a DEA structure consequently results in mechanical stresses in both the active and passive areas, it is useful to quantify the amplitude of the stresses, as well as its spatial distribution, corresponding to each operating condition based on the results from the FEA simulations. FIG. 18 shows the results of the computational simulations elucidating the effective Von Mises stresses at two different applied electric fields. The Mises effective stress as a function of radial distance from the observation site towards the edge of the active electrode region at 2000 V and 3000 V are shown in FIGS. 18a and 18b, respectively. At the bottom panels of these figures, the Von Mises contour plots elucidate the full-field results of the stress. The effective stresses within the observation site as a function of the entire range of investigated electric field are also shown in FIG. 18c. The full-field stress contour plots demonstrated nearly a uniform state of stress in the middle of the passive area, where the THz-TDS characterization took place. The Mises stress increased from 0.6 kPa at 1000 V to 2.5 kPa at 2000 V and finally reached a value of 7.3 kPa at 3000 V. However, it corresponded, not surprisingly, to approximately zero outof-plane stresses regardless of the applied voltages, which is due to the incompressibility of the VHB material and the resulting equi-biaxial stretching due to the symmetric geometry of the electrodes. Quantitatively, the plots in FIG. 18 shows the Mises stresses within the passive area varied between 7.3 kPa at the center to 7.2 kPa at 1.9 mm radially away from the center at 3000 V. This implies that the mechanical response was spatially uniform within the 3 mm maximum THz wave spot size used to interrogate the material. The results shown in FIG. 18 omitted the effect of pre-stretching due to the sample fabrication process given the static nature of the simulation, where the time-dependent properties are suppressed. In other words, accounting for the pre-stretch stress would offset the result linearly.

The Maxwell stress under the active electrode region is directly proportional to the square of the applied electric field (Equation 6), while the induced stresses at the observation site also exhibited nonlinear dependence on the stretch as described by the expression of the Yeoh Helmholtz free-energy potential in Equation 7. Therefore, the reported Mises stresses showed a nonlinear dependence on the applied voltage. The results signify that the applied voltage can remotely control the amplitude of the stress (however, nonlinearly) in the passive area, as shown in FIG. 18*c*. The stress contour plots also explicated the discontinuity behavior at the boundary between the active area where the electric field was applied and the surrounding passive areas, which were found to be in good agreement with previous results. This can be leveraged to concurrently explicate the dependence of the polymer response on the spatial variation of stress by developing novel electrode geometries. In all, as deduced from the contour plots shown in FIG. 18, the applied voltage in the active area resulted in uniform in-plane stresses that loaded the macromolecule chains in the vicinity of the observation site and effectively resulted in uncoiling and straightening of the chains, as discussed next.

FIG. 19*a* shows the time-domain signals collected using the THz-TDS setup. The results include the signal without the DEA sample in the terahertz beam path (denoted as 'Reference'). It also encompasses the signals with the sample in the terahertz beam path while it was being subjected to an increasing voltage from 0 V (referred to as 'Control') to 3000 V. On the other hand, FIG. 19*b* plots the same time-domain signals but with a focus on the major terahertz peak arriving between 20 ps and 30 ps, clearly showing the drifting locations and changes in the amplitude of the peaks with varying applied voltage. As soon as the applied voltage increased beyond 3000 V, mechanical failure occurred, where the VHB sample was ripped into two pieces starting at the electrode area. That is, the localized induced mechanical stresses under the electrodes due to the applied electric field exceeded the intrinsic mechanical strength of the material, as discussed above. This indicates that mechanical stress is indeed developing and compressing at the observation site as demonstrated based on the FEA simulation results.

Figures 20A, 20B:
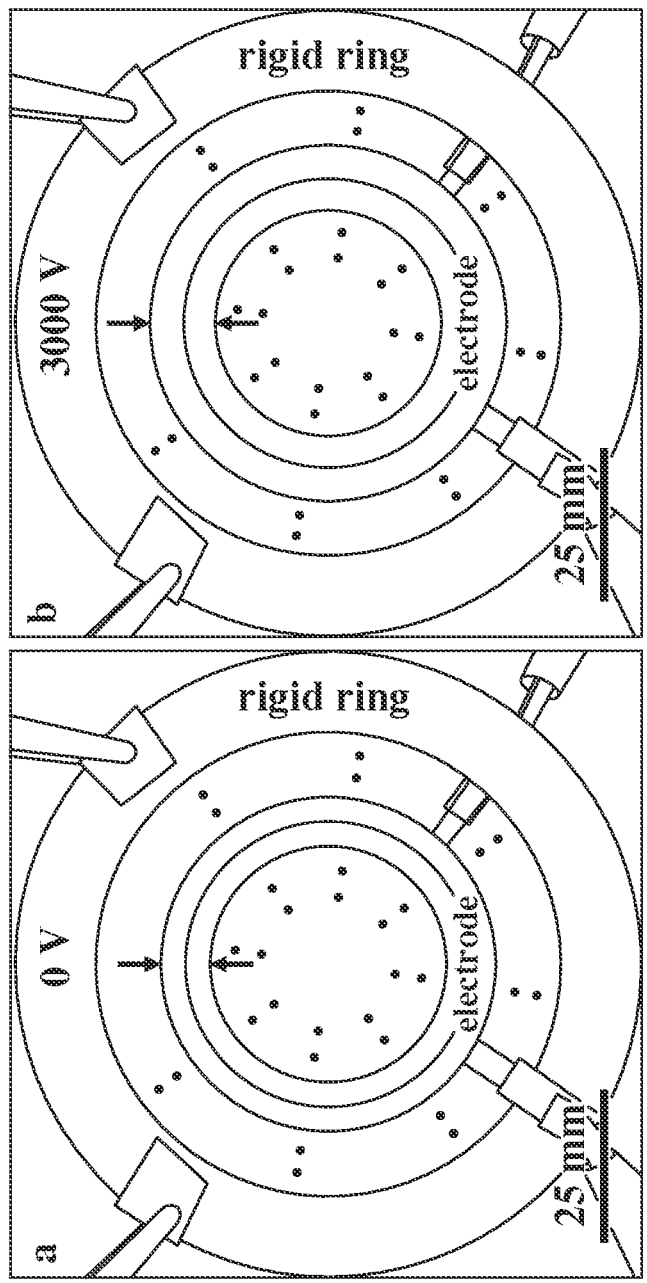
FIG. 20 shows: (a) starting DEA structure at 0 V showing the electrode configuration and (b) dilated electrode and stressed passive areas at 3000 V.

Additional physical evidence of the generation of mechanical stress under the electrode was the dilation of the electrode surface, where the region between the inner and outer diameter of the electrode annulus widened (FIG. 20*b*) to 10.4 mm at 3000 V constituting a 30% increase from the 8.0 mm initial width when no electric potential was applied (FIG. 20*a*). The increase in the annulus width changed non-monotonically as a function of the voltage such that the width of the annulus increased to 8.35 mm, 8.48 mm, 8.86 mm, 9.79 mm, and 10.35 mm corresponding to 500 V, 1000 V, 1500 V, 2000 V, and 2500 V, respectively. The nonlinear widening of the electrode surface is consistent with the suppositions set forth by Equation 6 and Equation 7. Notably, the distance between the markers (black dots on the surface of the DEA sample) located outside and inside the electrode area were also found to decrease, indicating that the external and internal areas were experiencing compressive stress. In all, the dilation of the electrode areas in response to the Maxwell stresses under the surface due to the oppositely poled electrodes coming closer together resulted in a uniform state of stress in the observation site. This points toward the validity of using the example DEA framework as a method of applying mechanical stresses to elastomeric polymers without obscuring the observation site.

Figure 19:
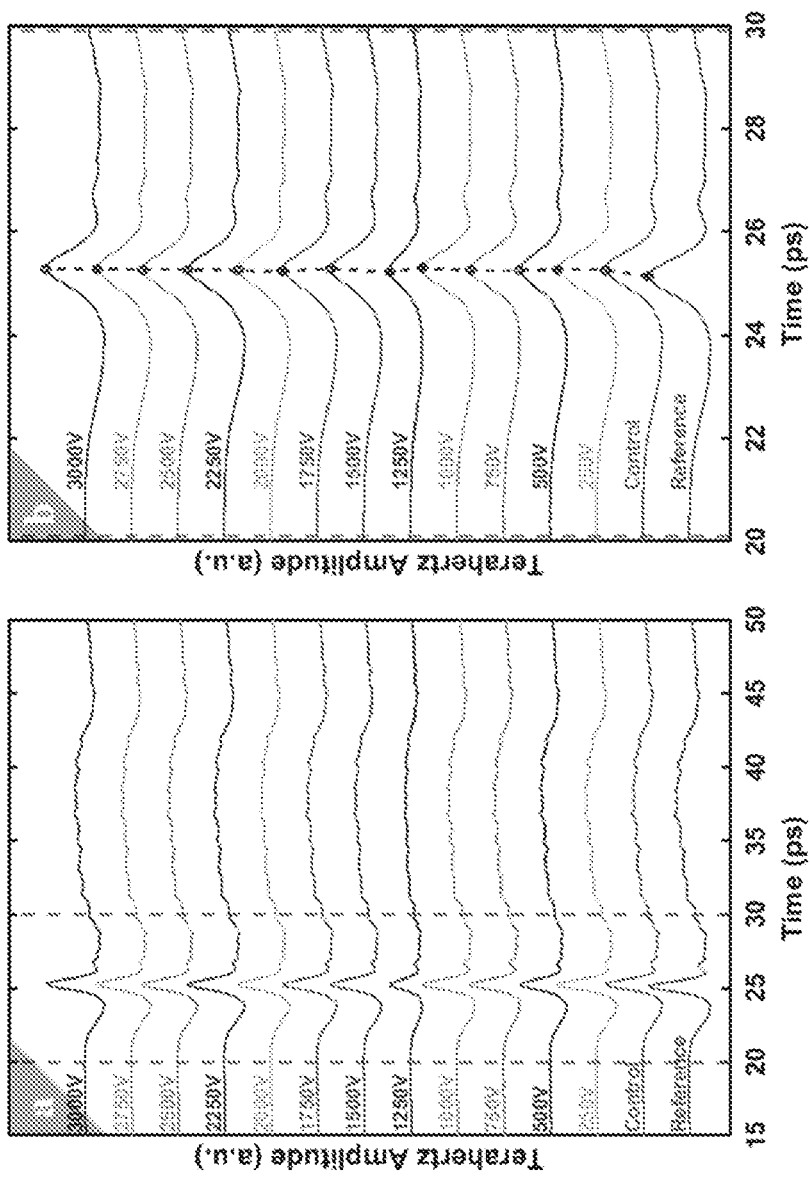
FIG. 19 shows: Terahertz time-domain signals (a) of sample-free (reference), unbiased-sample (control), and at increasing applied voltage ranging from 250 V to 3000 V at an increment of 250 V with (b) truncated signals between 20 and 30 ps to show the shifting temporal locations of the peaks and changes in the signal characteristics.

The results shown in FIG. 19 also point to changes in the signal characteristics based on the interactions between the propagating terahertz waves and the observation site of the DEA structure. Table 2, below, summarizes the extracted signal attributes as a function of the applied stresses in the electrode area (noting that stress is corresponding to the applied voltage across the thickness). Table 2 lists the estimated change in the thickness under the electrode and the estimated change in the thickness of the VHB film at the observation site as well as the amplitude, full-width at half-max (FWHM), rise time, and time delay of signal arrival between the corresponding applied voltage and the reference. First, the terahertz amplitude is found to change slightly (0.81±0.03 a.u.) compared to the reference signal (0.88 a.u.), representing an 8% reduction in the amplitude. The initial reduction in the amplitude between the reference and control conditions is attributed to the change in the imaginary part of the index of refraction (i.e., absorption coefficient) due to the presence of the stretched VHB film. Regardless of the cellular microstructure of VHB, the resulting change in the signal characteristics are associated with the interaction of the propagating terahertz wave with the polymer solid occupying the observation site. As the voltage increases the compression of the thickness under the electrode will induce a stretching of the annular electrode width and consequently compress the area inside the inner diameter of the ring, thus, the thickness of the VHB at the observation site will increase. This can be confirmed by the FEA simulation results seen in Table 2. That is to say, the reported further change of the signal amplitude is due to the change in the sample complex index of refraction upon applying the mechanical stress. The compression of the VHB due to the radial stress at the observation site results in an increase in the refractive and the absorption coefficient. As disclosed above, the self-boundedness of the annular electrode, the distance between the opposing electrodes, the insulation properties of the VHB polymer, and the remoteness of the observation site from the inner diameter of the electrode indicate the negligible effect of the applied electric field on the THz waves. The change in the amplitudes, whether from the reference sample-free to control (unbiased sample) or from the control to the biased conditions, are implicitly related to the change in the extinction coefficient since the reduction in the amplitude is a measure of damping.

Figure 21:
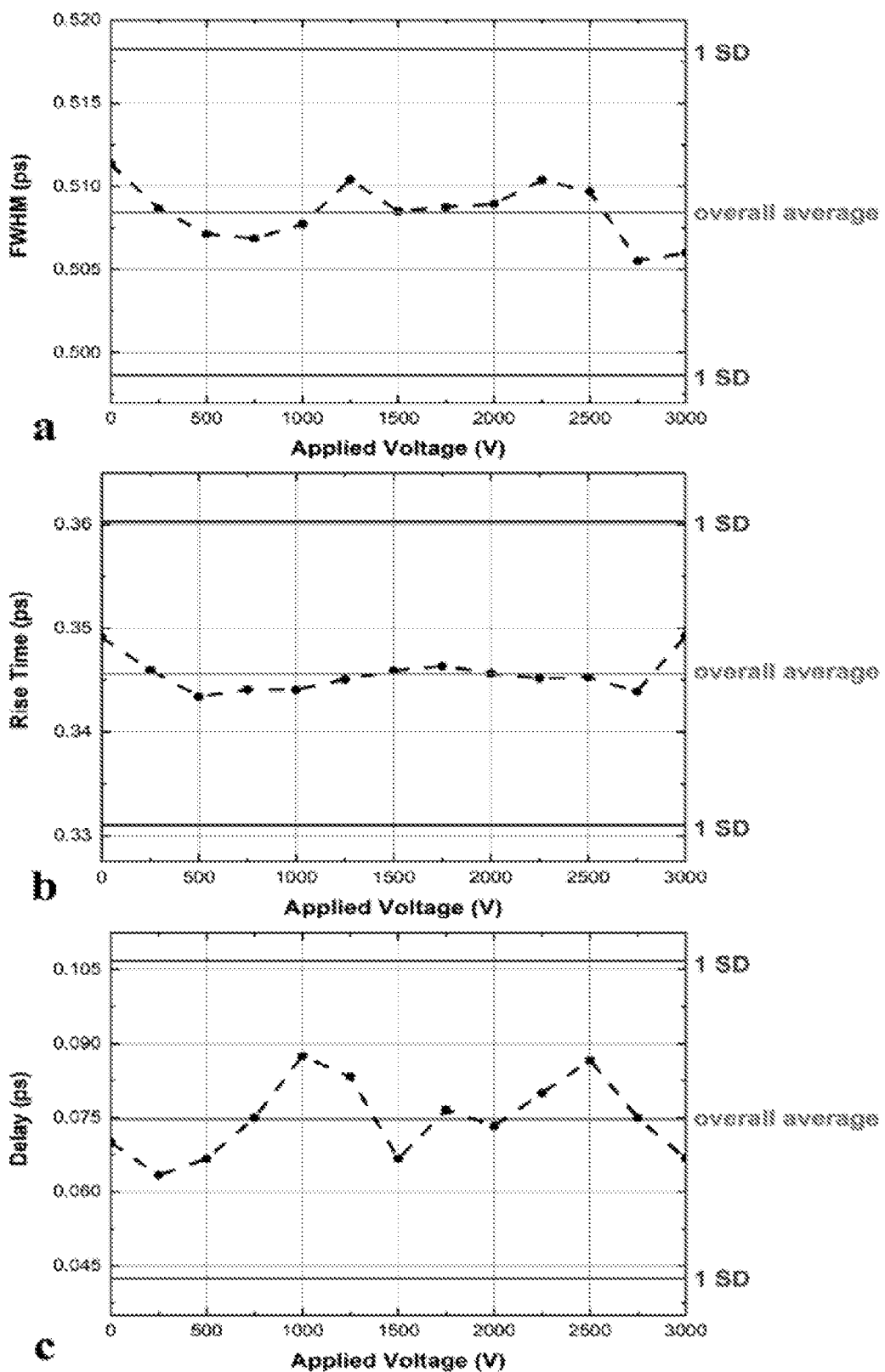
FIG. 21 shows: The temporal characteristics of the terahertz time-domain signals including (a) full-width at half-max (FWHM), (b) time rise, and (c) delay time of arrival based on data from Table 1.
Figure 22:
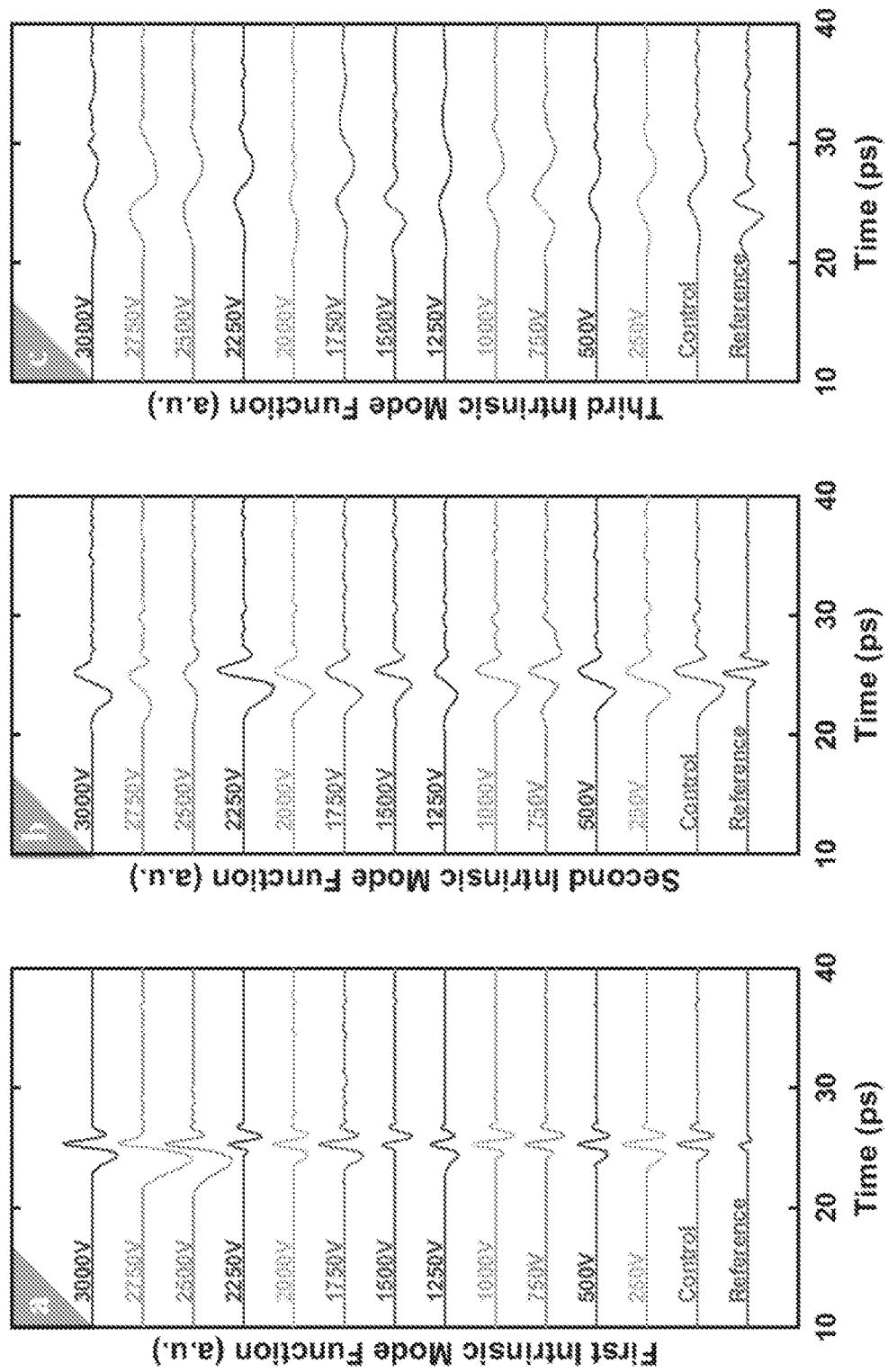
FIG. 22 shows: First (a), Second (b), and Third (c) intrinsic mode functions (high-frequency noise modes were omitted) of the THz time-domain signal elucidating the difference in the fundamental characteristics of the samples' waveforms as a function of applied voltage in comparison to the sample-free reference and zero-voltage conditions.

In addition to the amplitude variations, the temporal characteristics of the waves are also dependent on the applied stresses, which can be connected to changes in the real part of the index of refraction. These temporal attributes include the FWHM, the rise time, and the delay time of arrival, shown in FIGS. 21*a*, 21*b*, and 21*c*, respectively, based on the data from Table 2. A sudden change in the attributes of the time domain signals around 1250 V can be seen, where the FWHM and delay time were found to be 0.5104 ps and 0.08 ps, respectively. This change is believed to be associated with an initiated material instability resulting in a change in the mechanical deformation behavior under the electrode and at the observation site, after which, and once, the DEA structure re-equilibrated, the quasi-linear relationship between the applied voltages and induced stretches commenced. The peak width leading to the loading condition at 1250 V (14.1 kPa) continues to decrease due to an increase in the strains at the observation site, which, in turn, affects the local values of the strain energy. The broadening in the peak width at 14.1 kPa also corresponds to inflection of the delay time, where the difference between the arrival of the reference (sample-free) wave and the Therefore, to further elucidate the underlying changes in the microstructure, an example analysis method for spectroscopic data instead adopts the Hilbert-Huang transform (HHT) through a sifting process, also known as Empirical Mode Decomposition (EMD), e.g., as disclosed in Huang N E, Wu Z, Long S R, et al (2009) On instantaneous frequency. Adv Adapt Data Anal 1:177-229. EMD deconvolves the signal into its Intrinsic Mode Functions (IMF), whereas each IMF is monotonic, including the signal information at a single frequency component but still represented in terms of time. The first three IMFs of each investigated condition are represented in FIG. 22. In FIG. 22, IMFs pertaining to high-frequency noise were omitted and replaced by the next mode.

TABLE 2

Summary of signal characteristics as a function of the applied voltage (mechanical stress) and estimated thickness ($\Delta d_e$ is change in the thickness under the active electrode area and $\Delta d_{os}$ change in the thickness at the observation site).

| Applied potential (V) | % $\Delta d_e$ | pressure (kPa) | % $\Delta d_{os}$ | Terahertz Amplitude (a.u.) | FWHM (ps) | Peak Rise Time (ps) | Delay (ps) |
|---|---|---|---|---|---|---|---|
| 0 | 0.00 | 0.00 | 0.00 | 0.8060 | 0.5113 | 0.3491 | 0.0700 |
| 250 | 0.04 | −0.56 | 0.00 | 0.8039 | 0.5087 | 0.3460 | 0.0633 |
| 500 | 0.13 | −2.25 | 0.04 | 0.8205 | 0.5071 | 0.3434 | 0.0667 |
| 750 | 0.29 | −5.07 | 0.07 | 0.8249 | 0.5069 | 0.3441 | 0.0750 |
| 1000 | 0.50 | −9.01 | 0.13 | 0.8279 | 0.5077 | 0.3441 | 0.0875 |
| 1250 | 0.80 | −14.07 | 0.20 | 0.8272 | 0.5104 | 0.3451 | 0.0833 |
| 1500 | 1.16 | −20.26 | 0.29 | 0.8310 | 0.5085 | 0.3459 | 0.0667 |
| 1750 | 1.61 | −27.58 | 0.39 | 0.8331 | 0.5088 | 0.3464 | 0.0767 |
| 2000 | 2.14 | −36.02 | 0.52 | 0.8325 | 0.5090 | 0.3457 | 0.0733 |
| 2250 | 2.75 | −45.59 | 0.68 | 0.8361 | 0.5104 | 0.3452 | 0.0800 |
| 2500 | 3.48 | −56.28 | 0.86 | 0.8365 | 0.5097 | 0.3453 | 0.0867 |
| 2750 | 4.32 | −68.10 | 1.07 | 0.8380 | 0.5055 | 0.3439 | 0.0750 |
| 3000 | 5.30 | −81.05 | 1.55 | 0.8511 | 0.5060 | 0.3492 | 0.0667 | arrival of the terahertz wave after passing through the stressed-sample is found to be 0.0833 ps. This suggests a drop in the index of refraction (i.e., getting closer to the index of air). The real part of the index of refraction can be calculated from the delay time ($\Delta t$) between the initial arrival of the reference wave and the sample signal such that $n=1+(c\Delta t/\delta)$, where c is the speed of light in vacuum and $\delta$ is the thickness of the VHB film. Therefore, any changes in the delay time signify a variation in the index of refraction (n). Using the data in Table 2, the index of refraction is estimated to be 1.71, which is in good agreement with the published index by the manufacturer by considering the stretching effects on the optical properties of the material.

Due to the limitations of existing state-of-the-art analysis techniques, terahertz time-domain signals of ultrathin samples, as it is the case herein, are not suitable for transformation to the frequency domain based on the limits set by Scheller M (2014), Data extraction from terahertz time domain spectroscopy measurements. J Infrared, Millimeter, Terahertz Waves 35:638-648, as a function of frequency resolution, and bandwidth of the signal. In Fourier Transform based analysis technique, Scheller et al. discussed that the prerequisite for the lower bound for sample thickness using terahertz spectroscopy is defined based on, $\delta_{min}=c/2n\Delta f$, where, the refractive index is taken here to be 1.79 [60] and $\Delta f$ is the bandwidth (estimated to be 1.5 THz for our setup). That is, the time-domain signal from a sample with a thickness below 56 μm cannot be effectively analyzed in the frequency domain. This is a shortcoming of the post-processing step rather than the spectroscopy technique itself.

The resulting intrinsic mode functions shown in FIG. 22 are the first three oscillation modes embedded in the signals. Generally, the first and second intrinsic mode functions of the THz-TDS signals exhibit distinct behaviors expressed by an individual wave packet centered approximately at 25 ps with notable changes in the attributes of each wave packet. The apparent increase in the amplitude of the wave in the first modes compared to the amplitude of the reference signal is attributed to the change in the index of refraction due to the presence of the VHB samples in the terahertz wave path. The shape and characteristics of the wave packet at 1250 V continue to support the previous observations of an inflection point in the response, where the wave packets at higher levels of stresses (i.e., voltage) are distinctively different from their low stresses counterparts. Further, the third intrinsic mode function for the reference signal contains higher energy, whereas the $3^{rd}$ IMFs of the VHB sample appear to represent the trend of the data rather than an oscillation mode. Indeed, the concentration of the energy in the first and second mode functions is in excellent agreement with the association of the conformational orders, as discussed above, given that higher frequencies (higher energy) are linked to lower-order modes.

At the outset, using the DEA structure in experimental methods was found to be a reliable way to remotely apply a uniform state of stress without obscuring the observation site, hence, providing a pathway to non-invasively and non-destructively interrogate the polymer using non-contact terahertz time-domain spectroscopy (THz-TDS) techniques. Resulting loadings thus far were normal stresses due to the configuration of the active electrode area; however, the mechanical response of polymers has been shown to exhibit sensitivity to shear deformation due to the sliding and rearrangement of chains in response to mechanical work. Example methods can provide an electrode area configuration that selectively gives rise to shear and normal stresses on the same or different locations within the same DEA structure. The coupling between electrostatic and mechanics is used to remotely and systemically apply mechanical stresses.

The results provide physical evidence on the effect of conformational changes of polymers through analyses of time-domain signals that signified changes in the optical properties of the sample (index of refraction). HHT can be used in some example methods to decompose the time-domain signals into its fundamental modes, hence, decoying the shortcomings of current state-of-the-art analysis techniques in the frequency domain.

CONCLUSION

Example apparatuses and methods can provide, among other things, a fundamental coupling between polymer chain rearrangement and the incoming load, which is exaggerated at different temperature and ultrashort periods of loading. The latter allows one to approach the intrinsic behavior of materials, hence enabling fundamental understanding at the molecular level, which is previously not possible.

Example methods and systems herein enable researchers and practitioners (for the first time) to dynamically load a material under ultrahigh rates of deformation simulating incoming hyper-velocity projectiles while concurrently controlling the temperature. Unique to such apparatuses and systems, among other features, is the ability to apply shock waves, measure the rate and state of mechanical deformation, as well as explicate the intermolecular motion. The latter is the distinguishing factor in the performance of shock-tolerant polymers or polymer-based structures.

Features of some example embodiments include, among other things, non-contact mechanical loading mechanism at high strain rate; an intimate spectroscopy technique; and interrelation between mechanical loading and spectroscopic changes. Such features can provide a comprehensive system for characterization of polymers while being dynamically loaded and, optionally, at different environmental conditions.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Also, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor, or processors, with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as modules. The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those of ordinary skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, circuits, and process steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments discloses herein may be embodied directly in hardware, in a software module executed by a processor, or in a combination of the two. A software module may reside in RAM memory, flash memory, ROM memory, EPROM memory, EEPROM memory, registers, hard disk, solid state disk, optical media (e.g., CD-ROM), or any other form of transitory or non-transitory storage medium known in the art. An exemplary storage medium can be coupled to the processor such that the processor can read information from, and write information to, the storage medium. In the alternative, the storage medium can be integral to the processor. The processor and the storage medium may reside in an ASIC. The ASIC may reside in a user terminal. In the alternative, the processor and the storage medium may reside as discrete components in a user terminal.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12% 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

What is claimed is:

1. An apparatus for dynamic characterization of a sample of a material under test comprising:
   a terahertz (THz) time-domain spectroscopy system configured and arranged to generate and detect terahertz waves to interrogate the sample;
   a shock wave loading system configured and arranged to produce a shock wave in the sample;
   wherein the sample undergoes changes in an index of refraction in response to the produced shock wave in the sample that are detected by the terahertz time-domain spectroscopy system during the interrogating; and a non-contact interferometer positioned with respect to the sample to further detect free-surface displacement in the sample.

2. The apparatus of claim 1, wherein the THz time-domain spectroscopy system comprises one or more optical and terahertz components excited by an optical laser pump.

3. The apparatus of claim 1, wherein the terahertz time-domain spectroscopy system comprises:
an optical laser pump;
a transmitter for receiving a beam from the optical laser pump and generating a terahertz wave propagating through the sample; and
a receiver for receiving a terahertz wave from the sample and generating an electrical signal.

4. The apparatus of claim 3, wherein the optical laser pump comprises a femtosecond laser, the transmitter comprises a photoconductive antenna transmitter, and the receiver comprises a photoconductive antenna receiver.

5. The apparatus of claim 3, wherein the terahertz time-domain spectroscopy system further comprises:
a beam splitter that receives the beam from the optical laser pump and emits output laser beams along at least a first path leading to the photoconductive antenna transmitter and a second path leading to the photoconductive receiver; and
a selectively adjustable delay leg disposed in the first and/or the second path.

6. The apparatus of claim 5, wherein the delay leg comprises one or more optical dielectric mirrors.

7. The apparatus of claim 1, wherein the ultrafast shock wave loading system comprises a Q-switch laser having an energy of at least 0.1 J and a short pulse duration.

8. The apparatus of claim 1, wherein the shock wave loading system comprises a dielectric elastomer actuator.

9. The apparatus of claim 1, further comprising:
a chamber for housing the sample.

10. The apparatus of claim 9, wherein the chamber comprises an inert gas purged container.

11. The apparatus of claim 9, further comprising:
an environmental control device for inducing an environmental change in the sample.

12. The apparatus of claim 11, wherein the environmental control device comprises one or more of a cryogenic stability chamber, a convection heater, an induction coil, a Peltier element, one or more electromagnetic field generators, an ultraviolet light generator, or a supercooled gas.

13. The method of claim 1, wherein the THz time-domain spectroscopy system is configured to interrogate the sample concurrently with the shock wave loading system produce the shock wave in the sample.

14. The method of claim 1, wherein the THz time-domain spectroscopy system is configured to interrogate the sample at least partially after the shock wave loading system produces the shock wave in the sample.

15. The method of claim 1, further comprising:
a sample made from a polymer.

16. An apparatus for dynamic characterization of a sample of a material under test comprising:
a terahertz (THz) time-domain spectroscopy system configured and arranged to generate and detect terahertz waves to interrogate the sample;
a shock wave loading system configured and arranged to produce a shock wave in the sample;
wherein the sample undergoes changes in an index of refraction in response to the produced shock wave in the sample that are detected by the terahertz time-domain spectroscopy system during the interrogating;
wherein the shock wave loading system is an ultrafast shock wave loading system comprising a laser,
wherein the ultrafast shock wave loading system comprises a Q-switch laser having an energy of at least 0.1 J and a short pulse duration.

17. The apparatus of claim 16, wherein the ultrafast shock wave loading system further comprises a mode conversion prism to receive an output from the laser and exfoliate a sacrificial surface to generate an ultrafast shock wave through the sample.

18. The apparatus of claim 16, further comprising:
a non-contact interferometer positioned with respect to the sample to detect free-surface displacement in the sample.

19. A method for testing a sample of a material under test, the method comprising:
producing a shock wave in the sample; and
generating and detecting terahertz waves to interrogate the sample, wherein the sample undergoes changes in an index of refraction in response to the produced shock wave in the sample;
generating electrical signals in response to the detected terahertz waves;
detecting free-surface displacement of the sample during said generating terahertz waves; and
analyzing the generated electrical signals in the time domain and the free-surface displacement to determine one or more mechanical properties of the sample.

20. The method of claim 19, wherein:
(a) said generating and detecting terahertz waves is concurrent with said producing a shock wave in the sample;
(b) said generating and detecting terahertz waves is at least partially subsequent to said producing a shock wave in the sample;
(c) the produced shock waves comprise ultrafast shock waves;
(d) said detecting free-surface displacement of the sample uses an interferometer; and
(e) the sample is disposed in a chamber; and the method further comprises introducing at least one environmental change in the sample before or concurrently with said generating and detecting terahertz waves to interrogate the sample.

\* \* \* \* \*